United States Patent
Qiu et al.

(10) Patent No.: US 6,809,486 B2
(45) Date of Patent: Oct. 26, 2004

(54) ACTIVE VIBRATION AND BALANCE SYSTEM FOR CLOSED CYCLE THERMODYNAMIC MACHINES

(75) Inventors: Songgang Qiu, Richland, WA (US); John E. Augenblick, Richland, WA (US); Allen A. Peterson, Kennewick, WA (US); Maurice A. White, Richland, WA (US)

(73) Assignee: Stirling Technology Company, Kennewick, WA (US)

(*) Notice: Subject to any disclaimer, the term of this patent is extended or adjusted under 35 U.S.C. 154(b) by 4 days.

(21) Appl. No.: 10/016,966

(22) Filed: Dec. 14, 2001

(65) Prior Publication Data

US 2002/0121816 A1 Sep. 5, 2002

Related U.S. Application Data

(60) Provisional application No. 60/257,080, filed on Dec. 15, 2000.

(51) Int. Cl.$^7$ .............................................. H02K 41/00
(52) U.S. Cl. ....................................... 318/135; 318/128
(58) Field of Search ............................... 318/114, 119, 318/126–130, 135; 310/12–14, 51, 112; 62/6; 355/53, 72, 75

(56) References Cited

U.S. PATENT DOCUMENTS

| | | | |
|---|---|---|---|
| 4,489,554 A | 12/1984 | Otters | 60/518 |
| 4,567,726 A | 2/1986 | Vitale et al. | 60/520 |
| 4,945,726 A | 8/1990 | Beale | 60/520 |
| 5,018,357 A | * 5/1991 | Livingstone et al. | 62/6 |
| 5,117,642 A | * 6/1992 | Nakanishi et al. | 62/115 |
| 5,245,830 A | 9/1993 | Aubrun et al. | 62/6 |
| 5,392,607 A | 2/1995 | Wu | 62/6 |
| 5,412,951 A | 5/1995 | Wu | 62/6 |
| 5,654,596 A | 8/1997 | Nasar et al. | 310/12 |
| 5,836,165 A | 11/1998 | Champion et al. | 62/6 |
| 5,895,033 A | 4/1999 | Ross et al. | 267/161 |
| 5,918,463 A | 7/1999 | Penswick et al. | 60/517 |
| 5,991,799 A | 11/1999 | Yen et al. | 709/218 |
| 6,050,092 A | 4/2000 | Genstler et al. | 60/520 |
| 6,079,960 A | * 6/2000 | Funatsu et al. | 417/488 |
| 6,091,887 A | * 7/2000 | Dieterle et al. | 388/811 |

FOREIGN PATENT DOCUMENTS

WO      WO 10/10186      *   2/2000

OTHER PUBLICATIONS

*Applied Time Series Analysis*, vol. 1, Basic Technique, Robert K. Otnes and Loren Enochson, Wiley–Interscience, a division of John Wiley & Sons, Inc., 1978, month unknow.
*Random Data: Analysis and Measurement Procedures*, Julius S. Dendat and Alaan G. Piersol, Wiley–Interscience, a division of John Wiley & Sons, Inc., 1971, month unknown.

* cited by examiner

Primary Examiner—Thanh Lam
Assistant Examiner—Judson H. Jones
(74) Attorney, Agent, or Firm—Wells St. John P.S.

(57) ABSTRACT

An active balance system is provided for counterbalancing vibrations of an axially reciprocating machine. The balance system includes a support member, a flexure assembly, a counterbalance mass, and a linear motor or an actuator. The support member is configured for attachment to the machine. The flexure assembly includes at least one flat spring having connections along a central portion and an outer peripheral portion. One of the central portion and the outer peripheral portion is fixedly mounted to the support member. The counterbalance mass is fixedly carried by the flexure assembly along another of the central portion and the outer peripheral portion. The linear motor has one of a stator and a mover fixedly mounted to the support member and another of the stator and the mover fixedly mounted to the counterbalance mass. The linear motor is operative to axially reciprocate the counterbalance mass. A method is also provided.

23 Claims, 9 Drawing Sheets

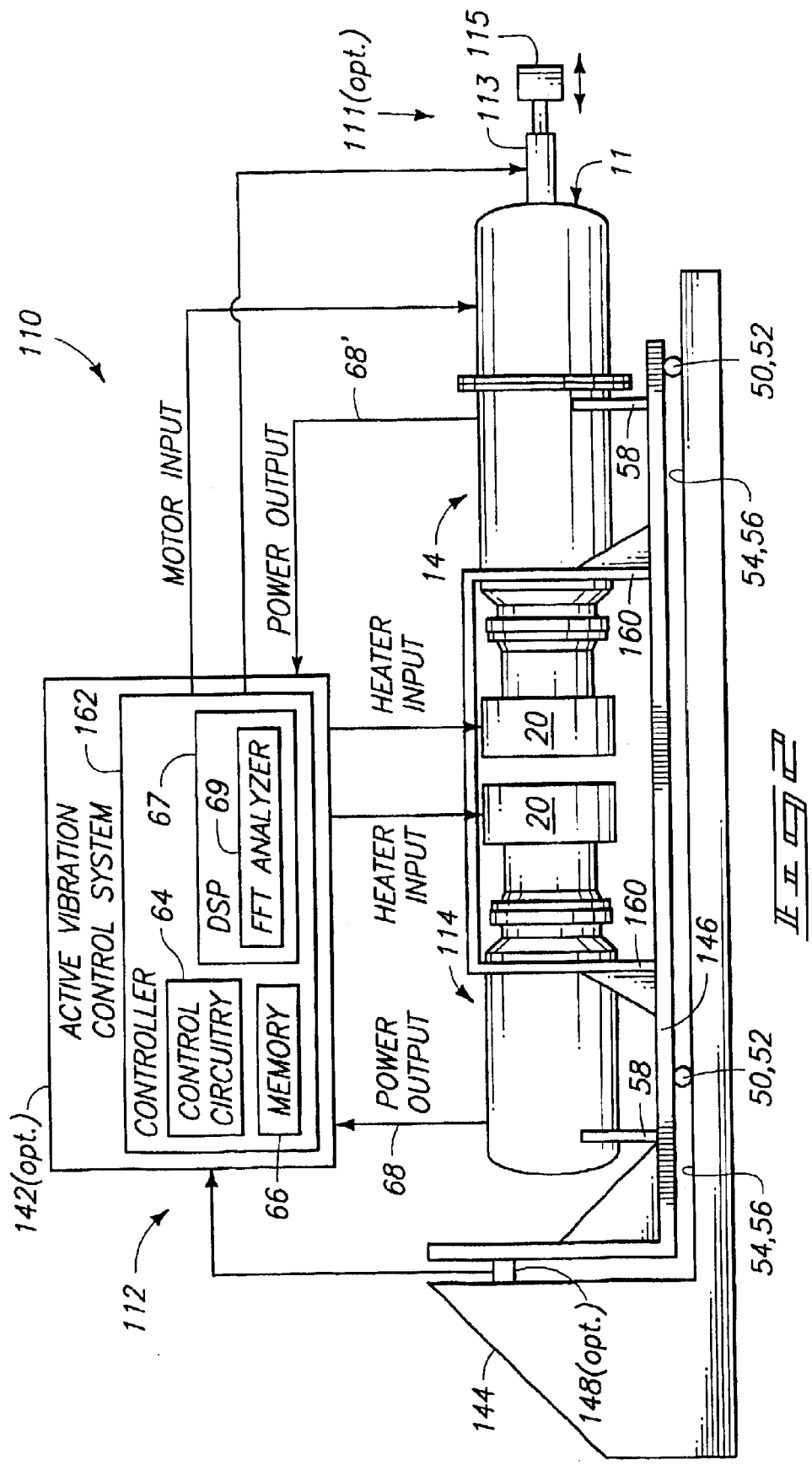

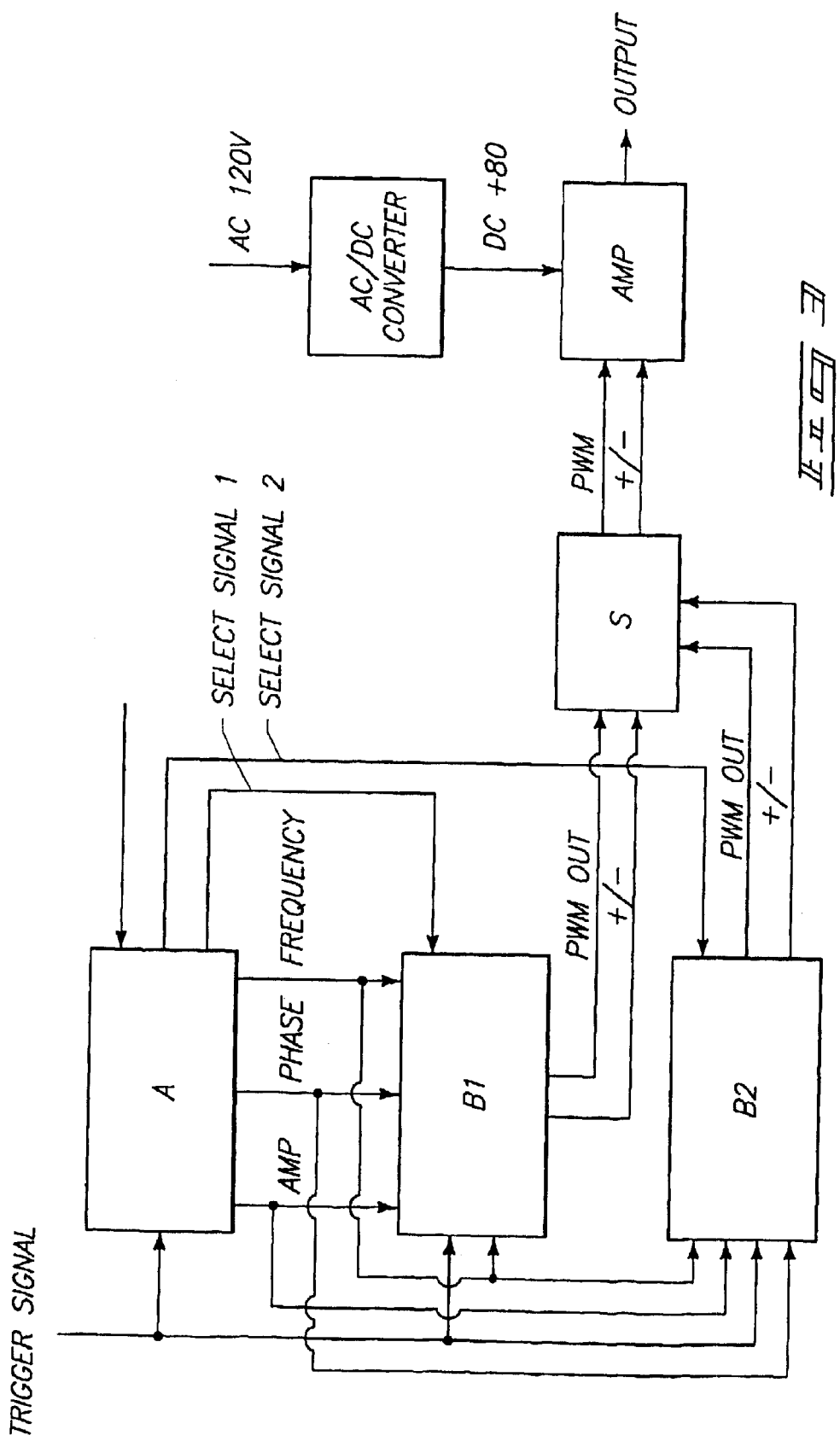

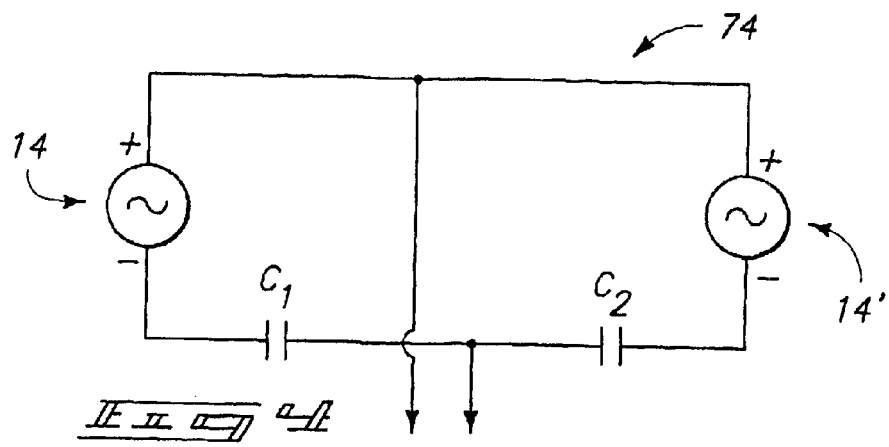
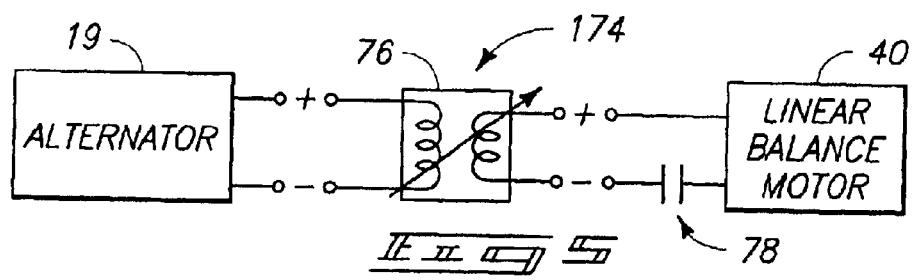
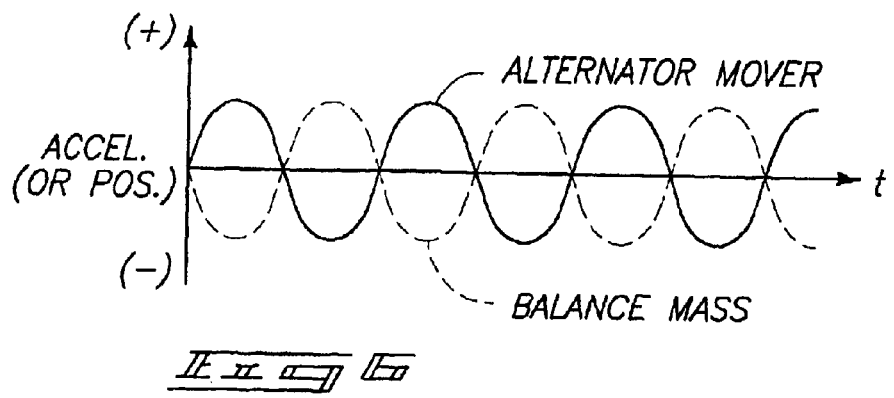
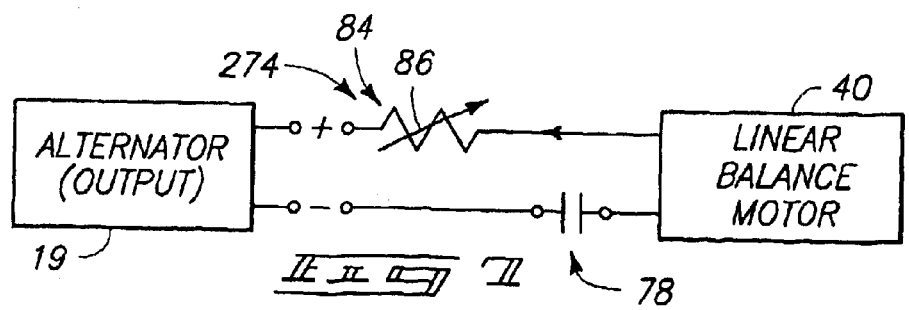

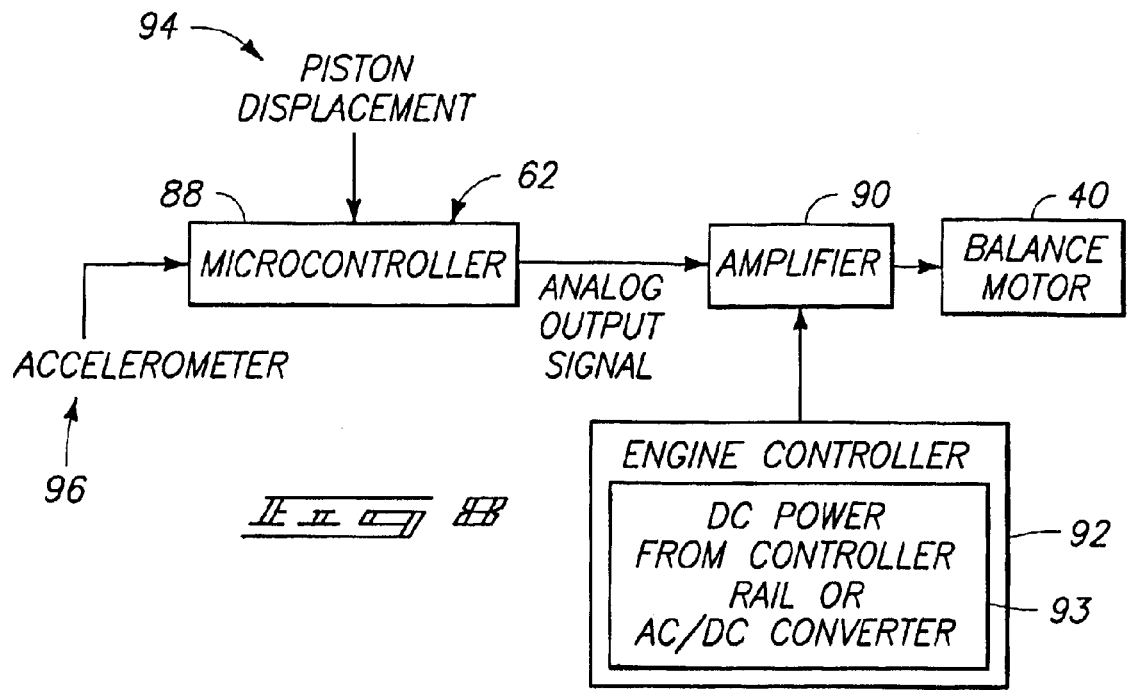
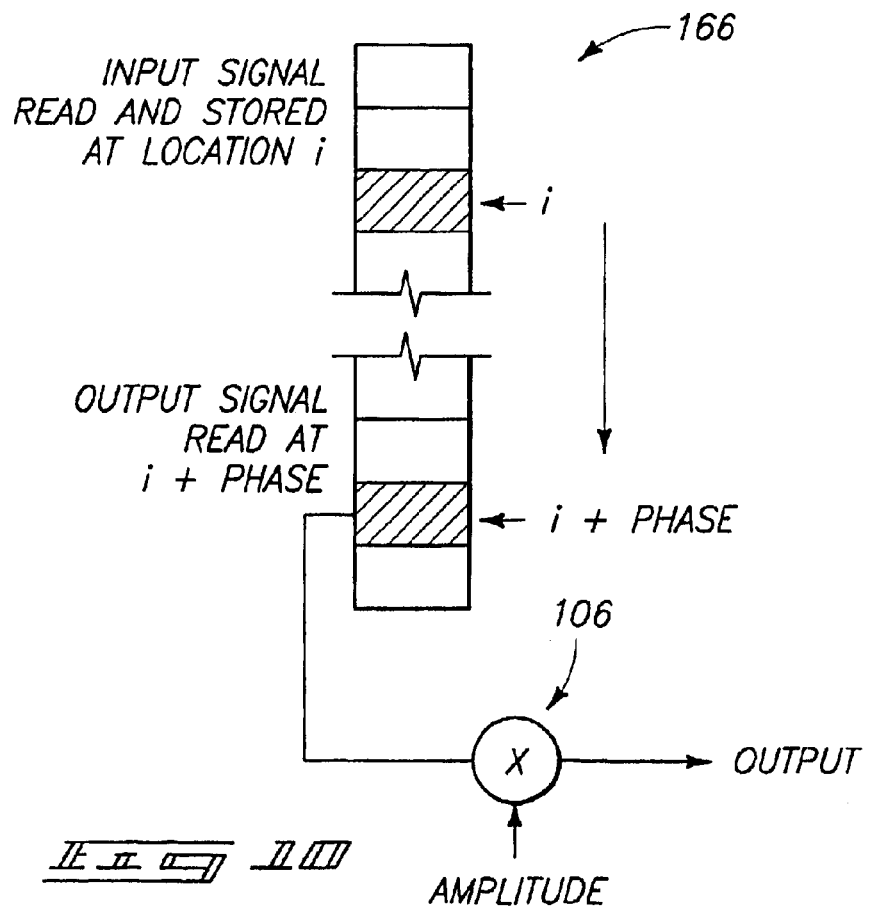

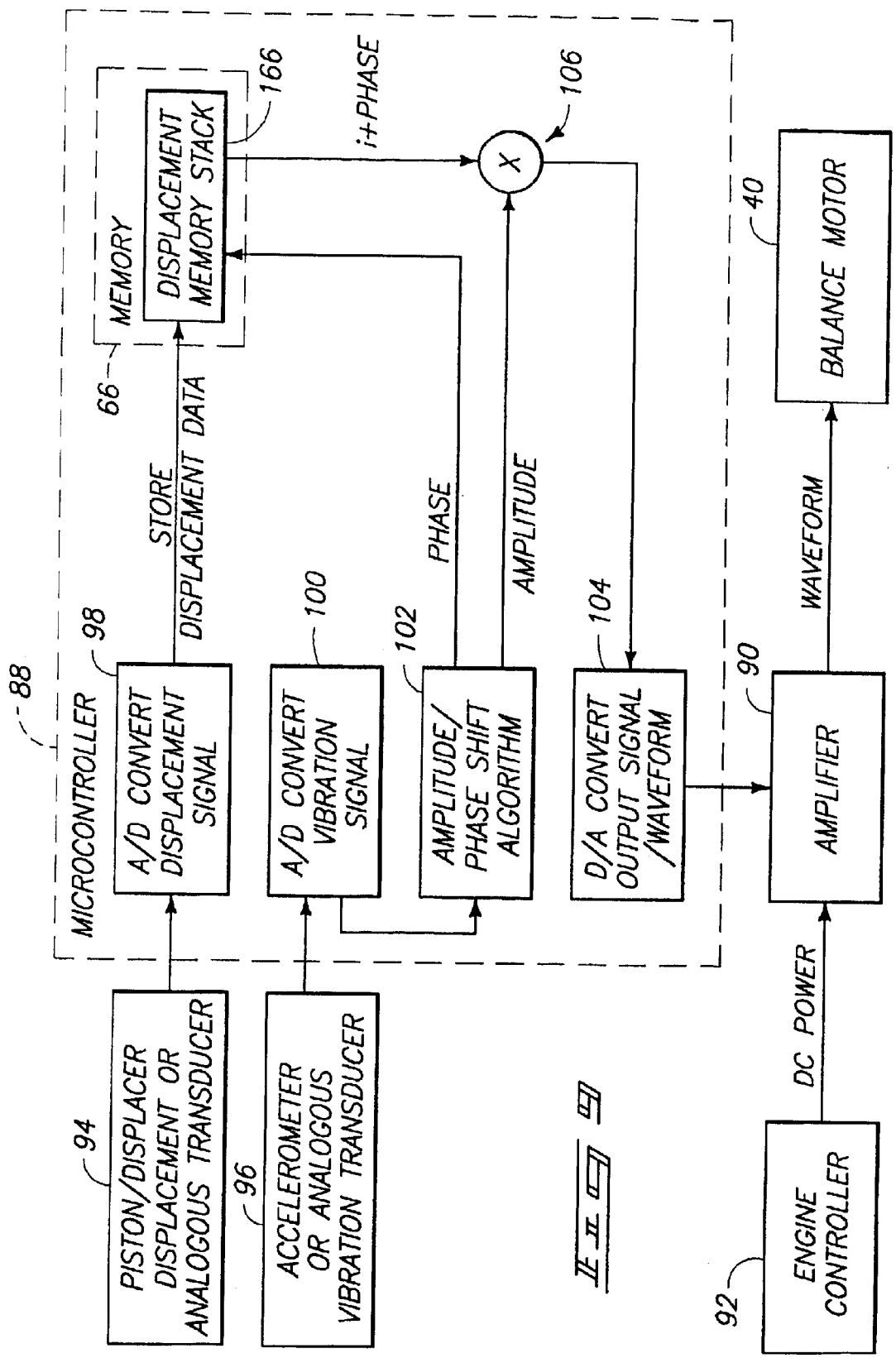

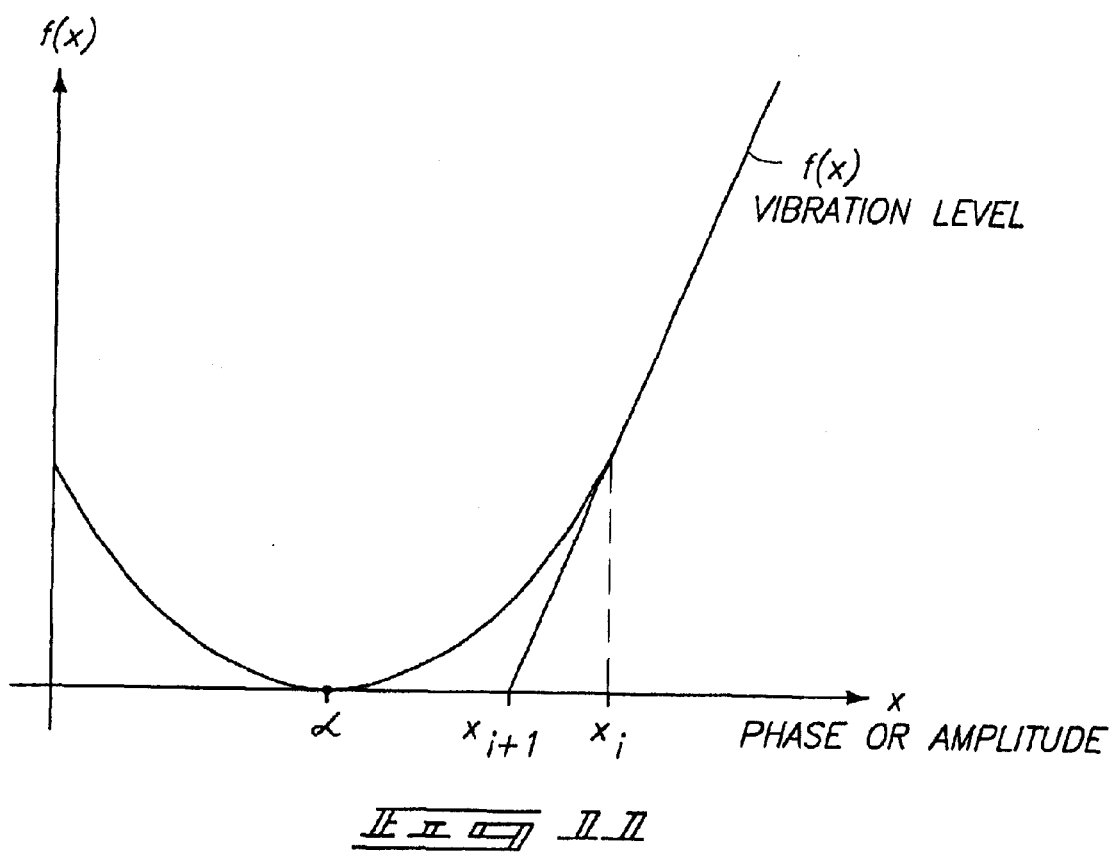

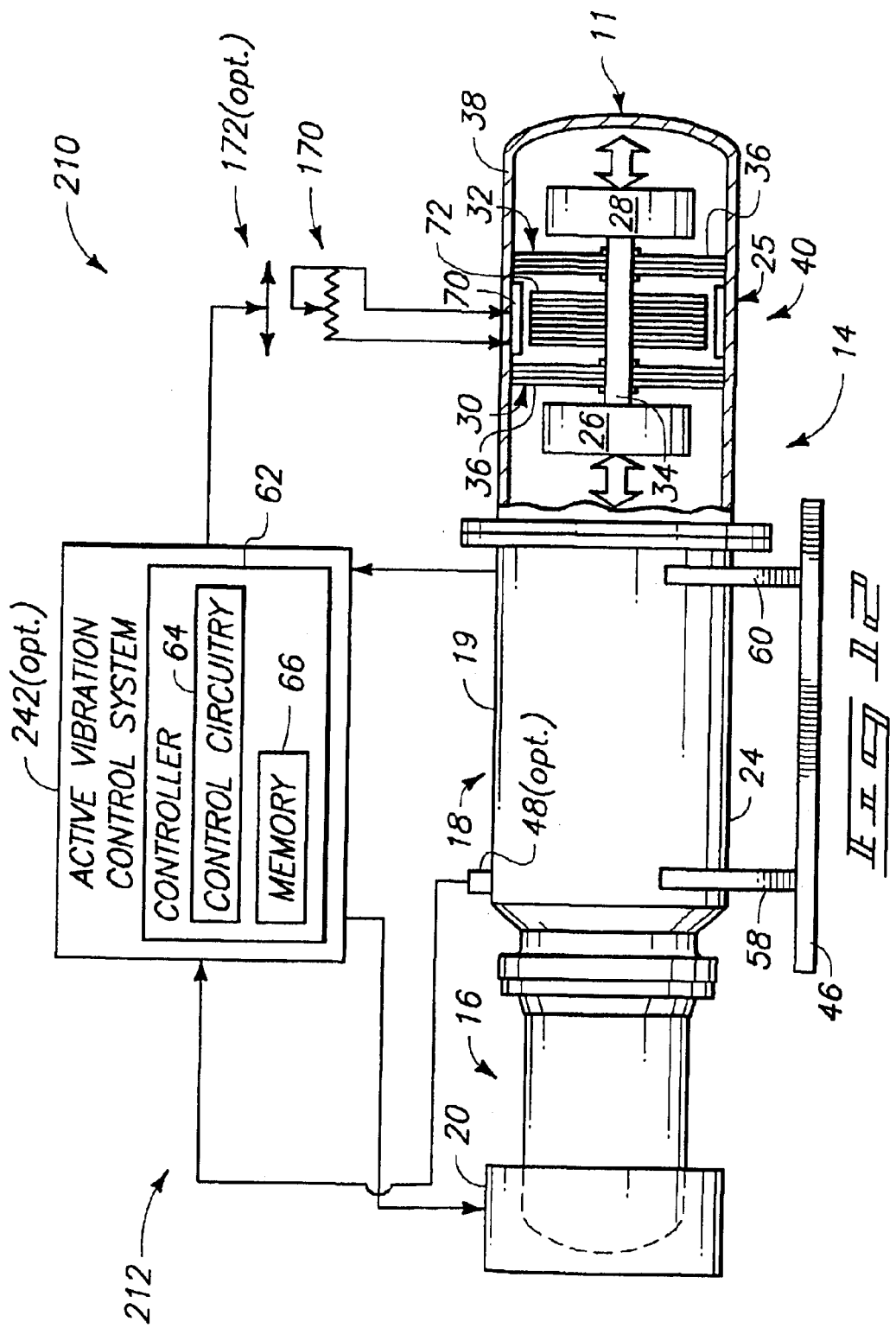

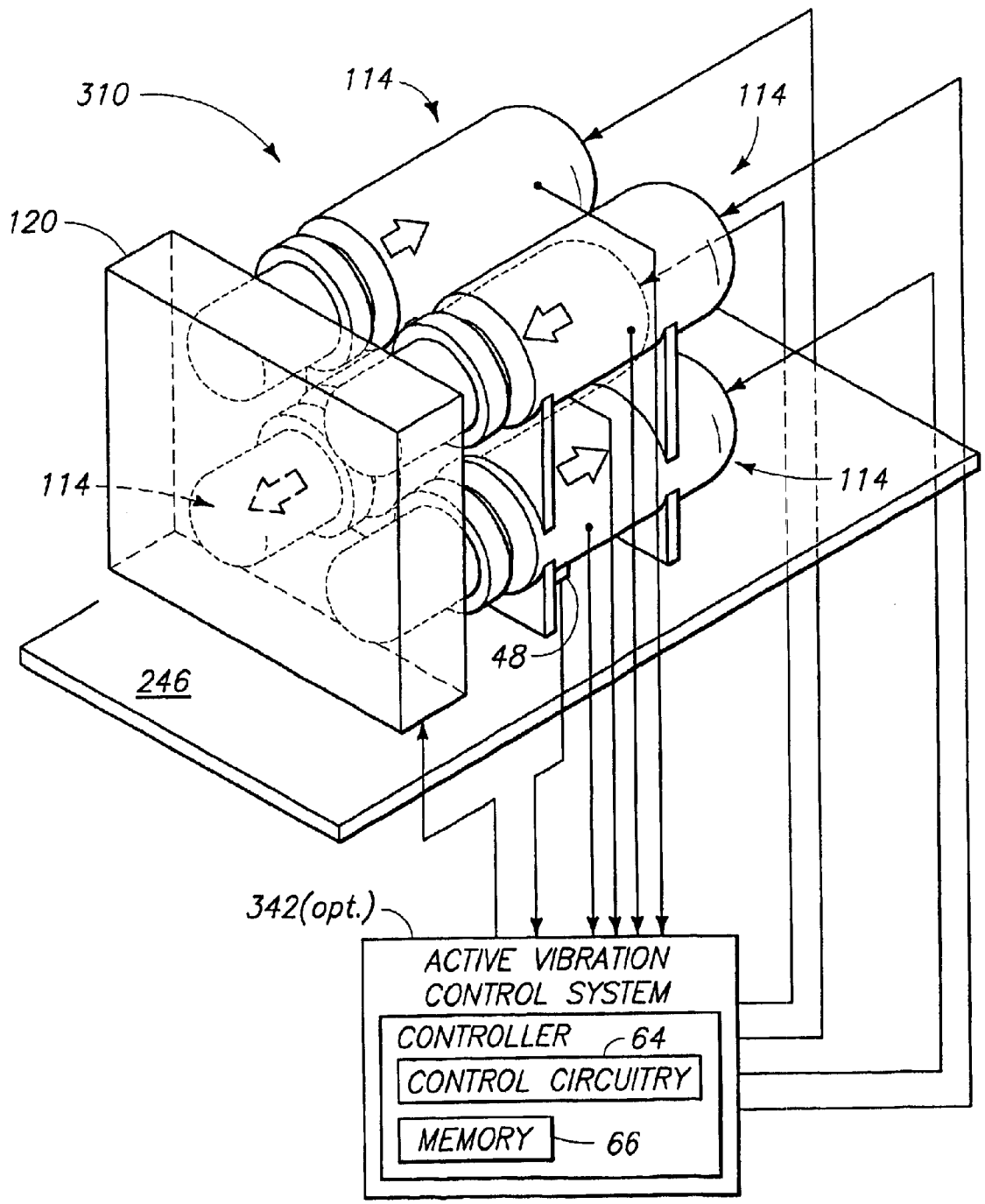

US 6,809,486 B2

ACTIVE VIBRATION AND BALANCE SYSTEM FOR CLOSED CYCLE THERMODYNAMIC MACHINES

RELATED APPLICATIONS

This application claims the benefit of U.S. Provisional Patent Application Ser. No. 60/257,080, which was filed Dec. 15, 2000, and which is incorporated by reference herein.

PATENT RIGHTS STATEMENT

The invention described herein arose in the course of a Phase II Small Business Innovative Research (SBIR) Contract NASA 3-27817 between NASA GLENN and STIRLING TECHNOLOGY COMPANY. The Government has certain rights in this invention.

TECHNICAL FIELD

This invention relates to vibration balancing of machinery, and more particularly to an active vibration balancer and control system for a vibrating machine.

BACKGROUND OF THE INVENTION

As a result of the study of machine dynamics, numerous vibration-damping systems have been developed for reducing undesirable vibration modes that are generated when operating a machine. In order for a machine to transform or transfer energy, the machine typically has a number of fixed and moving bodies interposed between a source of power and an area where work is to be done. In operation, the bodies interact or cooperate one with the other. As an example, electric motors transform electrical energy into mechanical energy.

One form of machine that produces vibrations is a Stirling engine. A Stirling engine converts heat into reciprocating piston motion within a thermodynamic gas environment, wherein the thermodynamic gas works on the piston to create mechanical power. Such devices produce vibration when operating, principally along a single axis. Similarly, a Stirling cryogenic cooler converts electrical energy into reciprocating piston motion that operates on a thermodynamic gas via a reciprocating displacer to produce a cool region.

With nearly all types of linear reciprocating thermodynamic machines such as Stirling engines, vibration is caused by operation of the machine. For many machines, the vibration involves some form of reciprocating motion within the machine. It is frequently desirable to eliminate vibration that is created during operation of a machine. Many devices have been created for reducing, or eliminating, machine vibration.

One area where balance systems are in need of significant improvements is the field of linear motion machines, such as free piston Stirling machines. One exemplary free piston Stirling machine is a free piston Stirling cycle engine. A typical free piston Stirling engine contains a single displacer and a single power piston that cooperate in fluid communication via a thermodynamic working gas. Such an engine construction can be resolved into a machine vibration problem that principally has a one-dimensional vibration component. Such machines have relatively simple controls, but are inherently unbalanced. The reciprocating masses cooperate through the working gas, transmitting alternating forces while within a sealed vessel. Typically, operation of such a Stirling machine can produce large unbalanced dynamic vibration forces that require use of a large mounting structure to absorb forces produced during operation. Alternatively, sophisticated suspension arrangements are required to isolate the machine from its mounting structure. However, these systems frequently prove too complex and heavy where it is necessary that the system be portable and lightweight. For example, use of these devices for space exploration and remote site usage usually necessitates that the devices be constructed to have a minimized total weight.

One technique for reducing vibrations on Stirling cycle engines has been to incorporate a passive balance system, such as that disclosed in U.S. Pat. No. 5,895,033, and assigned to Stirling Technology Company, of Kennewick, Wash. Such passive balance system comprises flat spiral springs that support a counterbalance mass for axial movement relative to a housing of a vibrating machine, such as a Stirling cycle machine. The counterbalance mass is used to counteract a moving mass within the Stirling cycle machine. Spring rates for the passive balance system are chosen so as to set a natural frequency of oscillation for the passive balance system, wherein the frequency is near the operating frequency of the Stirling cycle machine. Accordingly, the passive counterbalance mass will be near resonance for the Stirling cycle machine. As the counterbalance mass oscillates, it cycles energy flow within the system between working gas and oscillating components (machine and passive balance system), and reduces the vibration forces created by the system over that which would otherwise be created solely by the Stirling cycle machine. In this manner, passive balance systems have been applied to Stirling cycle converters and coolers with a relative amount of success. However, such passive balance systems can only cancel vibration forces at a single frequency. Accordingly, passive balance systems are often only effective at reducing transmitted vibration, and typically cannot fully remove all the vibration forces, particularly for cases where a sensitive instrument is associated with the Stirling cycle machine.

For example, one application calls for use of a Stirling energy converter, in the form of a Stirling engine, to provide power for an electrical deep-space device on a spacecraft or a satellite that is orbiting the earth. Typically, either a solar collector or a nuclear heat source is used to drive the Stirling engine. The Stirling engine is mounted to a sub-structure of the satellite. However, if the Stirling cycle engine is rigidly coupled to the satellite structure, vibration forces will transfer through the coupling structure to the satellite. In some applications, such as a satellite application, transferred vibration forces will result in motion of the satellite. This resulting motion can be unacceptable for sub-systems of the satellite, such as sensitive optical equipment that may be mounted on the satellite.

Therefore, there is a need to provide an improved balance system for use with vibrating machines which provides a needed counterbalance mass that is more effective, is more adaptively controlled, and still has a relatively small overall mass. Furthermore, there is a need to provide such a counterbalance mass in a manner which can be easily tuned to accommodate specific operating frequencies of a linear motion machine, such as a Stirling cycle machine.

The present invention arose from an effort to develop an active balance system that is relatively low in cost, is relatively lightweight for a particularly sized counterbalance mass, can be implemented on a pair of opposed Stirling cycle machines or on a single machine, has vibration characteristics that can be easily tuned to a particular machine operating speed by controlling movement of the counterbalance mass relative to a Stirling cycle machine, and can be mounted with relative ease onto an existing machine along a desired line of vibration to be counterbalanced in one of several manners.

SUMMARY OF THE INVENTION

An apparatus and method are provided for reducing vibration forces created by a closed cycle thermodynamic machine, such as a Stirling cycle energy converter. More particularly, a balance system is actively controlled and supported on such an energy converter so as to minimize vibration of the system.

According to one aspect, an active balance system is provided for counterbalancing vibrations of an axially reciprocating machine. The balance system includes a support member, a flexure assembly, a counterbalance mass, and a linear motor or an actuator. The support member is configured for attachment to the machine. The flexure assembly includes at least one flat spring having connections along a central portion and an outer peripheral portion. One of the central portion and the outer peripheral portion is fixedly mounted to the support member. The counterbalance mass is fixedly carried by the flexure assembly along another of the central portion and the outer peripheral portion. The linear motor has one of a stator and a mover fixedly mounted to the support member and another of the stator and the mover fixedly mounted to the counterbalance mass. The linear motor is operative to axially reciprocate the counterbalance mass.

According to another aspect, a vibration balanced machine includes a housing member, a support member, a flexure assembly, a counterbalance mass, and a linear motor. The housing member carries a working member in substantially axially oscillating relation within the machine. The support member is configured for attachment to the housing member. The flexure assembly includes at least one flat spring having connections along a central portion and an outer peripheral portion. One of the central portion and the outer peripheral portion is fixedly mounted to the support member. The counterbalance mass is fixedly carried by the flexure assembly along another of the central portion and the outer peripheral portion. The linear motor has one of a stator and a mover fixedly mounted to the support member and another of the stator and the mover fixedly mounted to the counterbalance mass. The linear motor is operative to axially reciprocate the counterbalance mass so as to counterbalance at least in part vibration forces generated by movement of the working member within the housing member.

According to yet another aspect, an active vibration control system for an axially reciprocating machine includes a housing, a linear alternator, a counterbalance mass, a linear actuator, and analog circuitry. The linear alternator has a stator rigidly carried by the housing and a mover supported for axially reciprocating movement. The counterbalance mass is provided for axially reciprocating movement along an axis substantially coaxial with a motion axis of the mover of the linear alternator. The linear actuator communicates with the mass, is carried by the housing, and is configured to move the counterbalance mass relative to the alternator at a substantially common frequency. The analog control circuitry communicates with the linear actuator and is user adjustable to adjust displacement amplitude of the linear actuator relative to the mover of the linear alternator.

According to even another aspect, a vibration control system for linear reciprocating machines includes a first axially reciprocating machine, a second axially reciprocating machine, first tuning circuitry, and second tuning circuitry. A second axially reciprocating machine is rigidly mounted in aligned relation with the first axially reciprocating machine, is electrically coupled with the first axially reciprocating machine, and is operated in synchronized, opposed directions relative to the first axially reciprocating machine. The first tuning circuitry is associated with the first axially reciprocating machine, and the second tuning circuitry is associated with the second axially reciprocating machine. One of power to at least one of the machines and a tuning factor for at least one of the first tuning circuitry and the second tuning circuitry is adjusted to minimize vibration for the linear reciprocating machines.

According to even a further aspect, a method for controlling vibration from axially reciprocating machines includes providing a first axially reciprocating machine with an associated first tuning circuitry and a second axially reciprocating machine with a second tuning circuitry, wherein the first machine and the second machine are rigidly mounted together in axially aligned relation; AC coupling the first axially reciprocating machine with the second axially reciprocating machine; operating the first machine and the second machine in synchronized, opposed directions; and adjusting power to at least one of the machines or adjusting a tuning value for at least one of the first tuning circuitry and the second tuning circuitry to minimize vibration for the axially reciprocating machines.

BRIEF DESCRIPTION OF THE DRAWINGS

Preferred embodiments of the invention are described below with reference to the following accompanying drawings.

FIG. 2 is a partial breakaway side elevational view of a pair of opposed, coacting Stirling power generators with an inherent active balance system and an optional vibration control system similar to that shown in FIG. 1 embodying this invention.

FIG. 3 is a simplified schematic and block diagram for one implementation of control circuitry used to develop the active vibration control system of FIG. 1.

FIG. 4 is a simplified schematic circuit diagram for an alternative embodiment active vibration control system using opposed coacting Stirling power generators using coupled outputs and tuning capacitors.

FIG. 5 is a simplified schematic circuit diagram for a first embodiment of an analog control circuitry which includes a variable transformer and a capacitor.

FIG. 6 is a simplified schematic plot of acceleration vs. time for an alternator mover and a balance mass for the balance system of FIG. 1.

FIG. 7 is a simplified schematic circuit diagram for an alternative embodiment of the analog control circuitry of FIG. 6 which includes a divider circuit including a variable resistor and a tuning capacitor.

FIG. 8 is a simplified schematic block diagram illustrating microcontroller generation of vibration reduction waveforms for the controller of FIG. 1.

FIG. 9 is a more detailed schematic block diagram of the diagram of FIG. 8 illustrating further details of the microcontroller generation of vibration reduction waveforms for the controller of FIG. 1.

FIG. 10 is a simplified schematic view illustrating the reading and storing of engine output voltage within a table in memory of FIG. 9, and further illustrating microcontroller lookup of a value stored at a location phase shifted behind the current table location, and multiplied by an amplitude to determine a microcontroller output value.

FIG. 11 is a simplified plot illustrating a modified Newton's method implemented in the controller of FIGS. 1 and 8 and used to search for phase and amplitude.

FIG. 12 is a partial breakaway side elevational view of an alternative Stirling power generator over that shown in FIG. 1 and having a semi-active balance system with an alternator coupled to a load such as a resistor or a variable resistor that can also be optionally, actively controlled via a feedback control system of an active vibration control system.

FIG. 13 is a simplified partial perspective and schematic view of an alternatively constructed Stirling power generator and active balance system over that shown in FIG. 2 and having four parallel, opposite phase Stirling power generators providing an active balance system and an optional active vibration control system embodying this invention.

DETAILED DESCRIPTION OF THE PREFERRED EMBODIMENTS

Figure 1:
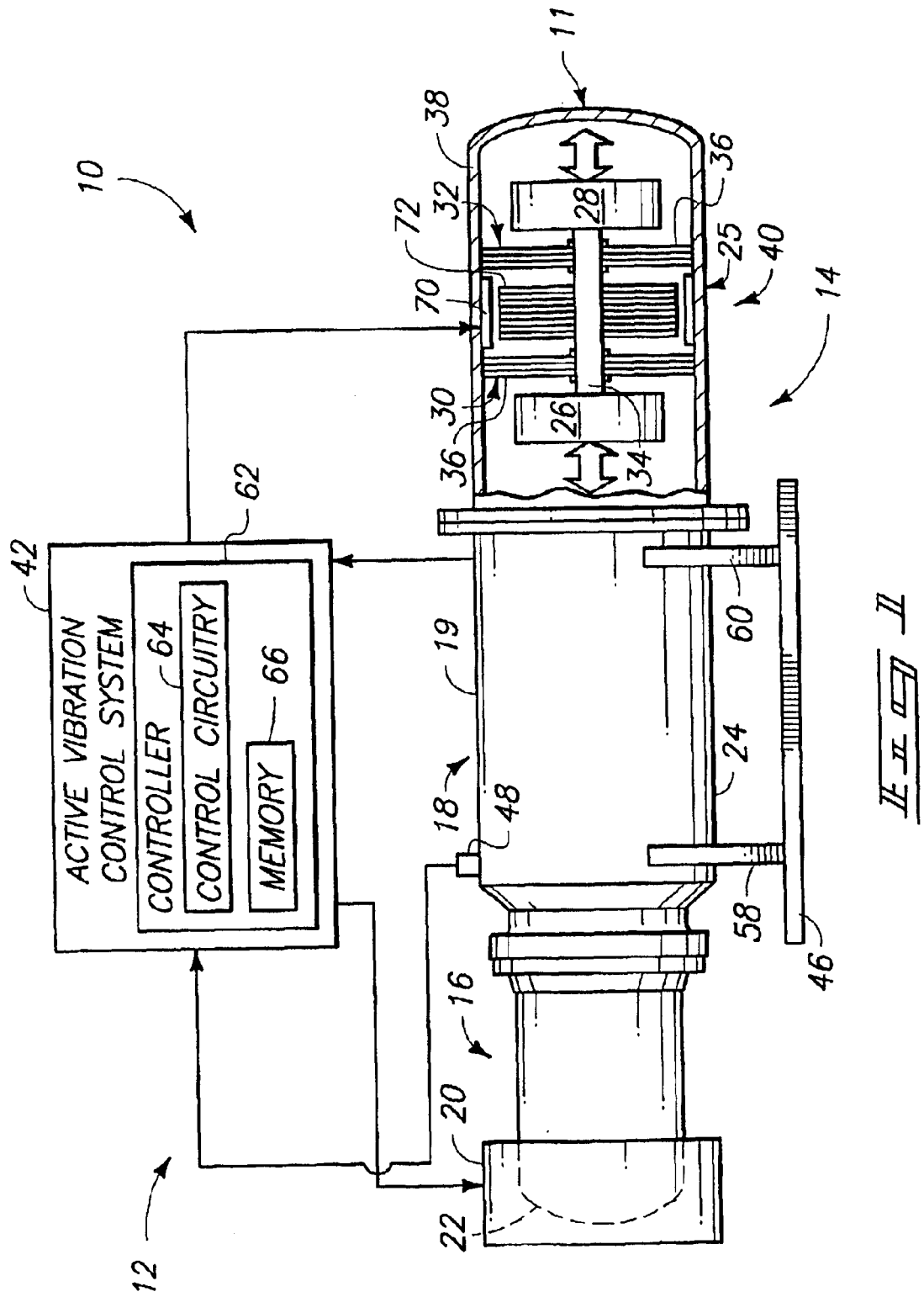
FIG. 1 is a partial breakaway side elevational view of a Stirling power generator with an active balance system embodying this invention.

This disclosure of the invention is submitted in furtherance of the constitutional purposes of the U.S. Patent Laws "to promote the progress of science and useful arts" (Article 1, Section 8).

Reference will now be made to several preferred embodiments of Applicant's invention. While the invention is described by way of preferred embodiments, it is understood that the description is not intended to limit the invention to these embodiments, but is intended to cover alternatives, equivalents, and modifications such as are included within the scope of the appended claims.

In an effort to prevent obscuring the invention at hand, only details germane to implementing the invention will be described in great detail, with presently understood peripheral details being incorporated by reference, as needed, as being presently understood in the art.

A preferred embodiment of a machine balance device configured as an active balance system is generally designated with reference numeral "10" in FIG. 1. A counterbalanced Stirling cycle generator system 12 comprises active balance system 10 mounted onto a Stirling cycle power generator, or engine, 14. Generator 14 comprises a single device energy converter that uses active balance system 10 to minimize vibrations. Alternatively, a pair of energy converters can be mounted in opposed relation in a manner that further utilizes active balance system 110, as shown below with reference to FIG. 2. Even further alternatively, a plurality of energy converters can be mounted in parallel relation, but run in opposed (180 degrees out of phase) relation from one another in conjunction with such an active balance system, as shown in FIG. 13.

Stirling cycle generator 14 has an engine module assembly 16 and a power module assembly 18. Power generator 14 is formed by joining together engine module 16 and power module 18 with a plurality of circumferentially spaced apart threaded fasteners (not shown). An interior volume of power generator 14 is filled with a charge of pressurized thermodynamic working gas such as helium. Alternatively, hydrogen or any of a number of suitable thermodynamically optimal working fluids can be used to fill and charge the inside of generator 14.

A heat source 20 applies heat to a heater head 22 of engine module 16, causing an alternator 19 of power module 18 to generate a supply of electric power. A displacer (not shown) within engine module 16, comprising a movable displacer piston that is assembled together with several separate components, reciprocates between a hot space and a cold space in response to thermodynamic heating of the hot space from heater head 22 via heat source 20. In operation, the displacer moves working gas between the hot and cold spaces. A power piston (not shown), suspended to freely reciprocate within power module 18 and in direct fluid communication with the cold space, moves in response to cyclic pressure variations within the cold space caused by reciprocation of the displacer.

Details of such a Stirling power generator are similar to those disclosed in U.S. Pat. No. 5,895,033, entitled "Passive Balance Systems for Machines", assigned to Stirling Technology Company, of Kennewick, Wash., assignees of the present invention. Such U.S. Pat. No. 5,895,033 is hereby incorporated herein by reference.

Details of one suitable construction for a heat source, or burner, 22 are disclosed in U.S. Pat. No. 5,918,463, entitled "Burner Assembly for Heater Head of a Stirling Cycle Machine", assigned to Stirling Technology Company, of Kennewick, Wash., assignees of the present invention. Such U.S. Pat. No. 5,918,463 is hereby incorporated herein by reference.

In operation, power generator 14 produces electrical power when heat source 20 applies heat to heater head 22. Accordingly, heat input produces electrical power output. The internal displacer assembly reciprocates when heat is applied to head 22 as working gas adjacent to the displacer expands as it is heated and contracts as it cools. Linear alternator 19, provided in fluid communication with the displacer via a power piston, is driven by fluid pressure variations created by reciprocation of the displacer. Accordingly, there are two internal assemblies within generator 16 that oscillate back and forth during operation.

Linear alternator 19 comprises a power piston and linear mover that are rigidly secured together for movement in unison. Reciprocating motion of the power piston within a receiving bore of a housing of the power module causes linear alternator 19 to produce electrical power. The power piston is rigidly carried on an end of an alternator shaft. A pair of flexure bearing assemblies support the piston and the shaft in accurate, axially movable relation relative to the bore, forming a clearance seal between the bore and the power piston. The shaft also carries inner moving laminations of the linear alternator. The power piston, the alternator shaft, the moving laminations, and the flexure assemblies all move in conjunction with pressure fluctuations that occur within the working chamber, in response to fluid pressure fluctuations created in the working fluid from movement of the displacer.

According to one construction, the effective center of mass of the reciprocating balancer moving members is coincident with the generator piston and displacer axis of motion. Further alternatively, the balance motor can be rigidly affixed to the Stirling engine by a central rod of the balance motor, whereas the counterbalance masses are affixed to an outer diameter of the flexure assemblies (in contrast to fixing the counterbalance mass to the central shaft, as shown in the embodiment depicted in FIG. 1).

As a result, an accurate axially reciprocating motion occurs two-dimensionally along the common axis of the displacer of the displacer assembly and the alternator shaft of the alternator assembly. The combined motion of the displacer assembly and the alternator assembly transfer acceleration forces to housing 24 of generator 14 during operation of the energy converter of generator 14. As a result, such motion and acceleration forces produce an unbalanced vibration resulting from acceleration of masses of the oscillating displacer assembly and linear alternator assembly.

To compensate for the unbalanced vibration that results from such reciprocating motion, a linear balancer 11 of active balance system 10 is mounted to an exterior housing member, or housing, 24 of generator 14 according to the construction depicted in FIG. 1.

Alternatively, the active balancer can also be located inside of the housing (such as within housing 24 of FIG. 1). As a further alternative, the balancer (including the reciprocating mass) can be divided into two or more separate balancer assemblies which are attached at discrete locations to the housing, as discussed in greater detail below.

As shown in FIG. 1, linear balancer 11 includes a pair of counterbalance masses 26 and 28 that are movably carried on a pair of flexure assemblies 30 and 32 via a central mounting post, or shaft, 34. Mounting post 34 is carried for axial reciprocation within a tubular support housing 38, along the center of flexure springs 36 of flexure assemblies 30 and 32. A linear motor 40 of linear balancer 11 drives masses 26 and 28, along with associated components such as shaft 34 in linear, reciprocating movement. Linear motor 40 is driven by an active vibration control system 42. As shown in FIG. 1, generator 14 includes linear motor 40.

Details of one suitable construction for linear motor 40 are disclosed in U.S. Pat. No. 5,654,596, entitled "Linear Electrodynamic Machine and Method of Making and Using Same", assigned to Stirling Technology Company, of Kennewick, Wash., assignees of the present invention. Such U.S. Pat. No. 5,654,596 is hereby incorporated herein by reference.

Linear motor 40 includes a stator assembly 70 and a mover assembly 72. Stator assembly 70 includes a stator and magnets. Mover assembly 72 includes a mover and slugs, or ferromagnetic laminations. A flux gap is provided between the ferromagnetic laminations and the magnets of stator assembly 70. Such magnets are typically provided along a radial inner surface of stator assembly 70, as illustrated in U.S. Pat. No. 5,654,596.

Flexure assemblies 30 and 32 are each formed from a plurality of flat spiral springs 36, each formed from a flat metal sheet having kerfs forming axially movable arms across them. The flat spring includes radially spaced connections for connecting in assembly to first and second members, respectively, for accommodating relative axial movement between structural members that are attached along an inner and outer periphery while maintaining such members in coaxial alignment. Further details of springs 36 and assemblies 30 and 32 are disclosed in U.S. Pat. No. 5,895,033, previously incorporated by reference.

A radial outermost edge of flexure springs 36 are rigidly mounted to a cylindrical support housing 38. Masses 26 and 28 (and associated moving system components) move with accurate axial reciprocation along an axis that is perpendicular to a circular plan view profile of cylindrical masses 26 and 28 and flexure assemblies 30 and 32. Preferably, active balance system 10 is mounted to housing member 24 so that the travel axis of moving masses 26 and 28 is parallel, and possibly coaxial, to a desired unbalanced vibration of generator 14.

Alternatively, the travel axis of moving masses 26 and 28 is aligned in parallel, and possibly coaxial, relation with a recognized component of vibration that one desires to counterbalance on a vibrating machine.

Further details of the construction and operation of power generator 14 that results in linear reciprocating unbalanced forces are described in Stirling Technology Company's previously mentioned U.S. Pat. No. 5,895,033 and are not repeated here as they only relate peripherally to the claimed inventive subject matter.

Generator system 12 comprises generator 14, heater head 22, a rigid support frame 46, an axial accelerometer 48, and active balance system 10. Accelerometer 48 is oriented to detect axial vibration of generator 14. Alternatively, a load cell 148 can be utilized, as depicted in reference to FIG. 2. Active balance system 10 includes active vibration control system 42. Rigid support frame 46 comprises a primary frame that is mounted or supported on a support structure, such as a frame of a satellite, or the floor of a building. Generator 14 is secured to frame 46 using a pair of rigid cross members 58 and 60.

Active vibration control system 42 receives an output signal from accelerometer 48 and generator 14. In response thereto, active vibration control system 42 generates an output signal that controls operation of linear motor 40 to control operation of active balance system 10 so as to minimize vibration forces generated by operation of generator system 12.

More particularly, active vibration control system 42 comprises a controller 62 including control circuitry 64 and memory 66. In one form, control circuitry 64 comprises processing circuitry such as that found in a microprocessor or a microcontroller.

When controllably operated by control system 42, linear motor 40 moves masses 26 and 28 to generate acceleration forces that counterbalance the vibration forces generated by operation of generator 14. By mechanically coupling together balance motor assembly 25 of active balance system 10 to housing member 24 of generator 14, vibration forces acting along the axis of vibration are substantially (if not completely) canceled therebetween.

It is further understood that any of a number of machines that produce unbalanced forces during operation, along one or more axes, can be counterbalanced by using one or more of the active balance systems 10 of this invention. Examples of such machines include any of a number of linearly reciprocating engines having moving pistons, or any of a number of closed-cycle thermodynamic machines having internal moving pistons and/or displacers. Each of these machines produces reciprocating unbalanced dynamic forces suitable for counterbalance with the devices of this invention. In fact, any machine producing one or more unbalanced forces having a multi-directional component of vibration could conceivably be used with the active balance systems of this invention by providing active balance systems along various directions comprising the vibration. Even further, it is intended that the balance system 10 of this invention can be used with any machine producing vibration. However, its full benefits are best realized when used on a machine producing unbalanced vibrations predominantly along a single axis and with a sinusoidal wave form. Hence, Stirling cycle thermal regenerative machines are suitable candidates for receiving the full benefits of this invention.

FIG. 2 illustrates an alternative embodiment implementation for active balance system 110, wherein a pair of Stirling cycle generators, or energy converters, 14 and 114 are rigidly mounted to a common secondary frame 146, via a pair of cross members 58 and a central box member 160. Generators 14 and 114 are operated so that their motion is synchronized and out of phase. Each generator has a dedicated heat source 20. Vibration forces caused by movement of respective mover/piston assemblies from each generator nearly cancel out each other. The same is true for vibrations from the respective displacer assemblies, thereby resulting in very low transferred vibration levels. The generators are then synchronized by coupling them together electrically in parallel in order to achieve a reduced (or low) vibration state. This is similar to how the linear balance motor (of FIG. 1) is coupled to the Stirling generator (or converter).

Such paired generator construction provides an alternative embodiment of a Stirling cycle generator system that is counterbalanced for vibration. The pair of generators 14 and 114 are mounted in opposed fashion, with the axes of vibration aligned therebetween, but with generators 14 and 114 mounted in 180-degree opposed directions with alternators connected electrically in parallel such that vibration forces are substantially cancelled therebetween. Secondary frame 146 is then mounted onto a primary frame 144. A load cell 148 is provided between frames 144 and 146, and wheels 50 and 52 cooperate with tracks 54 and 56.

More particularly, secondary frame 146 is coupled to rigid support frame 144 via load cell 148, as well as via bearing support wheels 50 and 52. Wheels 50 and 52 are received along either side of generators 14 and 114 in a pair of parallel tracks 54 and 56, respectively, on frame 144. Front and rear pairs of wheels 50 and 52 cooperate with tracks 54 and 56 to enable linear motion of frame 146 relative to frame 144 in a direction parallel to the axis of vibration for generators 14 and 114.

Load cell 148 interconnects frames 144 and 146 in a manner that enables load cell 148 to measure acceleration forces of frame 146 relative to frame 144. Alternatively, the accelerometer 48 can be utilized, as depicted with reference to FIG. 1. An output from load cell 148 is provided to controller 162. Wheels 50 and 52 prevent transfer of acceleration forces between frames 144 and 146, extending along the axis of vibration.

Accordingly, load cell 148 is effective at measuring the relative acceleration (or vibration) forces generated from operation of generators 14 and 114, as rigidly affixed to frame 146. Alternatively, wheels 50 and 52 can be replaced with resilient rubber isolation mounts.

According to Stirling cycle generator system 112, two generators 14 and 114 are mounted in opposed, mechanically and electrically coupled relationship. The outputs from each generator 14 and 114 are coupled together. Generators 14 and 114 are controllably operated so they operate 180 degrees out of phase with their reciprocating elements preferably moving coaxially. In this manner, the associated piston and mover assembly for each generator 14 and 114 will nearly cancel vibration forces that are created by operation of the generators (or energy converters). Furthermore, the associated displacer assemblies for each generator 14 and 114 also move with opposed motion so as to cancel out vibration forces therebetween.

As shown in FIG. 2, a first embodiment entails mechanically attaching together two engines 14 and 114, while electrically connecting together the respective linear alternators in parallel. Alternatively, the linear alternators can be connected together in series. By using such a mechanical connection, approximately 98% of the overall vibration can be balanced inherently by placing engines 14 and 114 in axially aligned and opposed relationship so as to provide an inherent active vibration control system. In essence, one engine provides the active balance function for the other engine.

Alternatively, a separate, dedicated active vibration control system 142 can be optionally provided. Active vibration control system 142 provides even further reduction of vibration. Furthermore, active vibration control system 142 can be used to provide vibration in the event engine 114 ceases to operate. According to such optional configuration, a further optional feature is the inclusion of a solenoid-actuated linear balancer 111, as discussed in greater detail below.

For most practical cases, the simple configuration wherein engines 14 and 114 are positioned so as to operate in opposed relationship will provide sufficient vibration reduction by way of the inherent configuration and 180 degrees phase shift between the operating modes of moving members contained therein.

Accordingly, optional active vibration control system 142 is provided when additional vibration forces may need to be removed. The removal of such additional forces is accomplished to a lesser degree when using the inherent active balancing provided by running an even number of similar free-piston engines/alternators where they are mechanically coupled together so that reciprocating forces from each piston are effectively conveyed to the assembly, and half the units have the linear alternator power pistons moving in one direction and the other half are moving in an opposite direction (180 degrees out of phase with each other). Accordingly, the axes of the center of mass of the group moving in one direction and the center of mass of the group moving in the other direction should be co-linear. Furthermore, the coils of the linear alternators are connected electrically in parallel, with a polarity such as to ensure that each piston moves in the desired direction at any given instant. For the case where the optional active vibration control system 142 is also provided, if one of the two coupled generators 14 and 114 fails, the active balance system 110 is operative to cancel out vibration forces from the single, operating generator.

In operation, generators 14 and 114 move together and out of phase, wherein the resulting vibration forces oppose each other. To ensure opposed motion between generators 14 and 114, the outputs 68 and 68' from the generators 14 and 114 are connected in parallel. As a result, any motion that is out of phase between generators 14 and 114 results in feedback that keeps generators 14 and 114 moving together, albeit 180 degrees out of phase from one another.

Active balance system 110 of generator system 112 is provided to further reduce any vibration forces that are not sufficiently reduced solely due to coupling between generators 14 and 114. More particularly, linear balancer 11, as described with reference to FIG. 1, is rigidly mounted to and included on generator 114, along with a solenoid-actuated linear balancer 111. Linear balancer 11 is controllably operated or actuated to minimize or reduce a lowest existing vibration mode between the engines. Solenoid-actuated linear balancer 111 is utilized to reduce or counterbalance any remaining higher modes of vibration, above those being cancelled by linear balancer 11.

The vast majority of vibration energy occurs at the first mode of vibration. Nearly 95% of the vibration is generated by a first mode vibration of a Stirling cycle engine. Linear balancer 11 can be configured in a single engine configuration (similar to that shown in FIG. 1) to cancel out the first mode of vibration. Linear balancer 111 can be configured and controlled to cancel out second, third, and/or higher modes of vibration. Linear balancer 11 is driven using back electromagnetic forces (EMF) from the Stirling engine, which proves to be very efficient. Accordingly, a tuned flexural actuator system is provided by linear balancer 11, using back EMF which takes only several watts of power to drive linear balancer 11. Accordingly, a majority of the vibration, comprising the first mode vibration, is substantially cancelled using a relatively small amount of overall energy.

According to one related art experimental control system technique, a pair of 350 Watt Stirling cycle engines were configured together in opposed relation, and further balanced with active balance system 110, as shown in FIG. 2. During an experimental test, a personal computer and a data acquisition system were used to acquire and generate control signals. However, a control algorithm was additionally developed. First, output signals were acquired from the two generators (or converters). Load cell 148 was used to quantify the vibration forces. Two generator output signals 68 and 68' and the load cell 148 signal were input into a LabVIEW VI (Virtual Instrument), a graphical programming development environment based on the G programming language for data acquisition and control, data analysis, and data presentation that is capable of performing fast Fourier transform (FFT) analysis. LabVIEW is available from National Instruments, of Austin, Tex. Applicant developed a virtual instrument (VI) for LabVIEW that comprises a signal analyzer that is used to search through amplitude and phase components of the output signal in place of active balance system 110. A binomial search technique was used to control the moving mass of balance system 110 in order to minimize transferred vibration force. The output signals, or waves, were stored in buffers and continuously generated until the buffers were updated and re-triggered.

The above-described experimental control technique did not output a smooth control signal. Additionally, it was not capable of realizing a high update speed. Accordingly, the control system was limited because it operated on a PC which had computational overhead.

As a result, another control algorithm was developed and tested for the pair of opposed, 350 Watt Stirling cycle engines. The second control algorithm was implemented on a PC using data acquisition techniques. A LabVIEW RT processing board, from National Instruments, of Austin, Tex., was combined with a dedicated processor and memory, as well as data acquisition hardware to implement the control algorithm. A binomial search algorithm was also implemented with this algorithm to find phase and amplitude in order to minimize vibration force. This second control algorithm and system increased speed and decreased processing bottlenecks.

However, both of the above-described algorithms, as applied to the system, proved to have a difficult time controlling the output signal (or wave) with respect to the input signal (or wave) from load cell 148. It was discovered that inaccurate hardware triggering caused such difficulties. Additionally, it takes time to acquire data in order to generate a new output signal which causes undesirable lag. During this acquisition time, the signal being generated moved out of phase with the input signal whenever there was a slight frequency mismatch between the generators. Such frequency mismatch often occurs because there exist inaccuracies in calculations when using the LabVIEW boards.

Accordingly, several problems were encountered when using a PC and LabVIEW to control the linear balance motor. For example, there is a problem with poor frequency tracking and phase control. Such problem relates to software and hardware issues, and thereby hindered developing an understanding of how the motor affected transferred vibrations.

As shown in FIG. 2, an active vibration control system 142 was implemented utilizing controller 162 to overcome the problems encountered when utilizing LabVIEW software on the processing boards to perform analysis. Controller 162 includes control circuitry 64, memory 66, and a digital signal processing (DSP) chip 67. DSP 67 includes a chip-based FFT analyzer 69. Accordingly, a DSP-based FFT analyzer 69 comprises a microcontrolled version of a LabVIEW processing board. One suitable DSP chip capable of implementing an FFT analyzer is sold by Microchip, of Chandler, Ariz., pursuant to a product line of PIC Micro Controller Units (MCUs).

As shown in FIG. 2, linear balancer 111 comprises a solenoid actuator 113 and a counterbalance mass 115. Solenoid 113 is controllably actuated via controller 162 in response to detection of higher modes of vibration via load cell 148. One suitable linear solenoid comprises a bi-directional linear solenoid sold by Ram Company, 3172 East Deseret Drive South, St. George, Utah 84790. Mass 115 is sized proportional to the intended higher modes of vibration which solenoid 113 and mass 115 are being controllably regulated to counterbalance. It is understood that the great majority of energy lost into vibration is found within the primary mode of vibration. Accordingly, linear balancer 111 is not necessary for all applications, but can be utilized where it is desirable to reduce higher modes of vibration. Accordingly, it is envisioned that linear balancer 111 could also be incorporated in the embodiment depicted with reference to FIG. 1.

As described below, the use of analog feedback control eliminates problems associated with using a PC control algorithm. Accordingly, a relatively simple controller was developed and used to minimize fundamental vibrations. The voltage required to drive the linear motor proved to be much less than the alternator output. A voltage divider was first tried to provide motor control, as described with reference to FIG. 7. Subsequently, a transformer was used in place of the voltage divider to allow for more accurate voltage control, as described with reference to FIGS. 5 and 6.

Fast Fourier Transform (FFT) Implementation

FIG. 3 illustrates construction of a further alternative control system and circuitry over that shown in the embodiment depicted in FIGS. 8, 9, 10 and 11. A single circuit board implementation is used to realize the control circuitry of FIG. 3. As a result, cost, size, and complexity are reduced. As described below, an algorithm is developed to determine the phase, amplitude, and frequency output requirements, wherein the algorithm will be similar to those used with existing vibration reduction systems. More particularly, such an algorithm comprises a fast Fourier transform (FFT) implementation that enables determination of phase, amplitude, and frequency output requirements. See Robert K. Otnes and Loren Enochson, *Applied Time Series Analysis*, Vol. 1, *Basic Techniques*, Wiley-Interscience, a division of John Wiley & Sons, Inc., 1978; Julius S. Bendat and Allan G. Piersol, *Random Data: Analysis and Measurement Procedures*, Wiley-Interscience, a division of John Wiley & Sons, Inc., 1971. Use of a control algorithm will enable updating in order to reflect any changes made during testing of the system.

As shown in FIG. 3, a compact and self-contained development prototype control system includes three microcontrollers: A, B1, and B2. Microcontroller A is configured to receive an input signal from accelerometer 48 (of FIG. 1) or load cell 148 (of FIG. 2). Microcontroller A synchronizes output to microcontrollers B1 and B2, and determines amplitude and phase for each, respectively. The amplitude and the phase are each 16 bit operations.

Microcontroller A comprises a DSP controller including a fast Fourier transform (FFT) analyzer, similar to FFT analyzer 69 (of FIG. 2). Such a DSP controller provides a microcontroller A which is configured to implement control, analysis, and frequency determination calculations.

Microcontrollers B1 and B2 each output 16 bit sine waves when selective signals 1 or 2, respectively, are on (or enabled). Microcontrollers B1 and B2 determine frequency when selective signals 1 or 2, respectively, are off (or disabled).

Switch (S) determines which microcontroller output will be used. Amplifier (AMP) is operative to convert a pulse width modulation (PWM) signal to an amplified analog voltage. An AC/DC converter converts 120-volt AC input into a DC output. Accordingly, the AC/DC converter amplifies and converts the pulse width modulated signal from switch (S) to an analog output signal. Although pulse width modulation is used in one embodiment, it is understood that the other techniques can be used to process signals from switch(es).

The alternative control system implementation of FIG. 3 provides an enhanced ability over the control system depicted in FIGS. 8–11 in that a fast Fourier transform (FFT) implementation can be used to minimize or eliminate system vibrations that are not multiples of a natural operating frequency of an engine. The implementation of FIGS. 8–11 enables cancellation of vibrations that are multiples of the natural frequency of the engine. However, a fast Fourier transform (FFT) implementation enables the ability to cancel vibrations that are not occurring directly from operation of the engine. For example, a structural support bracket mounted atop the engine might induce a vibration mode which is not an integer multiple of the natural operating frequency of the engine. Accordingly, the implementation of the additional control system features of FIG. 4 on top of those depicted in FIGS. 8–11 enables cancellation of such a vibration emanating from a mounting bracket or other structural component affixed to the engine.

Synchronized, Opposed Machine Control Implementation

FIG. 4 illustrates a further alternative embodiment, in simplified form, of Applicant's invention wherein a pair of Stirling cycle generators 14 and 114, similar to those depicted in FIG. 2, are connected back-to-back, in opposed fashion, so as to reduce or eliminate vibration therebetween. The implementation depicted in FIG. 4 is relatively inexpensive and economical in that the control system of FIGS. 1 and 2 has been eliminated. Instead, each engine is electrically coupled with a respective tuning capacitor C1, C2, respectively. By connecting together generators 14 and 114, vibration is reduced by AC coupling together the engines, and adjusting power therebetween, or by adjusting the value of each tuning capacitor C1 and C2. By adjusting power and/or the tuning capacitor for each engine, a relatively low total vibration can be realized therebetween. Such result is realized without utilization of the control system of FIGS. 1 and 2. Optionally, a controller can be utilized in order to sense vibration, and to make adjustments between the relative power of each engine and/or to automatically change the values of capacitors C1 and C2. Further optionally, a controller can be used without using any capacitors.

Further optionally, the circuit implementation of FIG. 3 can be added in order to incorporate the fast Fourier transform (FFT) analyzer of a DSP chip which will enable the implementation of FFT adjustments to input in order to balance operation of the overall engine system. Such an alternative configuration for FIG. 4 enables the detection of vibration that is off frequency from a fundamental frequency of either or both engines. Accordingly, such a control system using an FFT analyzer can make adjustments to the balance system that will reduce or eliminate these frequencies which are often the frequency of the fundamental frequency or multiples thereof. Such a system provides a relatively good system for reducing vibration of a system having relatively low overall system vibration, such as a back-to-back engine configuration as shown in FIG. 4. However, such implementation is limited by the response of the respective engines.

Nonetheless, the control algorithms and systems for the previously described LabVIEW implementation encountered hardware-related problems that made it difficult to control active balance system 110 without using a PC and complex data acquisition circuitry and firmware. To overcome such problem and simplify the control system, an analog control scheme was developed and implemented, as described below.

Analog Feedback Control Implementation

A predominant problem, encountered when using LabVIEW FFT control schemes discussed above, is the inability to realize proper signal (or wave) timing and frequency calculations. It was found that, when these variables could not be controlled, the signals (or waves) would vary from cycle to cycle, which resulted in inaccurate control of the active balance system. By using an analog control implementation, these problems were found to be eliminated because the output signal (or wave) was directly coupled to the input signal (from the generator voltage signal).

In order to cancel vibration forces, active balance system 10 or 110, but excluding control system 42 (of FIG. 1) and control system 142 (of FIG. 2), is rigidly and mechanically coupled directly onto generator 14 (in FIG. 1) and one of generators 14 and 114 (in FIG. 2). Additionally, the linear motor of active balance system 10 or 110 is directly coupled to the output signal from the generator (or converter) 14 or 114. In the case of two opposed generators 14 and 114 (as in FIG. 2), the linear motor is coupled to the output signal from one of the generators to which it is affixed. This has the effect of locking motion of the counterbalance mass of active balance system 110 with respect to the piston/mover assembly, thereby eliminating the majority of vibration forces during operation of a single generator (or converter).

Since the linear control motor of the active balance system operates at a different voltage than the generator (or converter) output, a voltage divider is used to couple together the linear motor and the generator (or converter). Details of one specific implementation for the voltage divider circuitry are described below with reference to FIG. 5. Details of another specific implementation for the voltage divider circuitry are described below with reference to FIG. 7.

The active vibration control system 42 (of FIG. 1) is used with a single generator (or converter) to couple together motion of the active balance system and components moving within the generator. The active balance system includes the above-described linear balance motor, along with the analog control circuitry of FIGS. 5 or 7.

More particularly, analog control circuitry 174 of FIG. 5 comprises a variable transformer 76 which is used to electrically couple the motion of the linear motor 40 and alternator 19 (see FIG. 1) of the Stirling generator.

Alternating, electrical output from the Stirling alternator provides an input signal to the analog control circuitry 174. This input signal is routed through variable transformer 76 in order to adjust the output voltage level. An output signal from transformer 76 is routed to the terminals of the linear balance motor 40, thereby providing a control signal that governs motion of linear balance motor 40.

By electrically coupling together alternator 19 and linear motor 40 via analog control circuitry 174, movement of linear motor 40 is synchronized with the mover/piston assembly of alternator 19. When the motions of the mover/piston assembly of alternator 19 are directly out of phase (180 degree phase shift) with linear motor 40, the vibration forces will nearly cancel out. In this case, it is understood that vibration forces created by movement of the displacer within the generator are not in phase with the mover/piston assembly, and thus, will not be canceled out. However, the mass of the displacer assembly is much smaller than that of the mover/piston assembly, and the vibration force contribution is relatively small.

In operation, linear motor 40 oscillates naturally due to transmitted vibration forces, and will generate electromagnetic forces (EMF) due to these oscillations. When the controller RMS voltage matches the EMF of the linear motor, there will be very little current flow, and average power consumption will be minimized. Accordingly, there is a potential to eliminate average parasitic power consumption, while still coupling the motor with the alternator to realize reduced, low levels of resultant vibration.

The resulting balanced Stirling cycle generator system is relatively robust because frequency of the linear motor is required to always be the same as the alternator frequency. Additionally, motion of the linear motor is phase-locked to the mover/piston assembly of the alternator, and they move directly out of phase from one another. These advantages of the balanced generator system, combined with relatively high operating efficiency and low power draw for the balance system, make the system better than prior art solutions.

With reference to FIG. 5, analog control circuitry 174 provides decoupling circuitry that is beneficial because a direct electrical connection between a linear motor and a Stirling alternator may produce negative effects when other electrical signals are fed to the linear alternator. There is a risk that such signals could change operation of the Stirling alternator if they feed back through the circuitry.

Accordingly, analog control circuitry 174 comprises a variable transformer 76, such as a Variac™ 76, and a tuning capacitor 78. Variac™ 76 breaks any direct electrical connection between alternator 19 and linear motor 40 by electromagnetically coupling together alternator 19 and motor 40.

As shown in FIG. 6, frequency and phase couple motion between the mover/piston assembly of the alternator and the moving balance mass of the balance system 10 or 110 provides for matching, canceling acceleration (vibration) forces. Shown, an alternator mover/piston assembly acceleration versus time plot is superposed over a balance mass acceleration versus time plot. It is understood that superposed position plots will appear very similar to the respective acceleration plots.

FIG. 7 shows an alternative construction for analog control circuitry 274 which uses a voltage divider 84 instead of a transformer (as used in FIG. 5). Voltage divider 84 comprises a variable resistor 86, wherein voltage divider 84 electrically couples together alternator 19 and linear balance motor 40. Such an experimental Stirling generator (or energy converter) was constructed and then operated at several power levels, as well as in several physical configurations. Several physical configurations include: without a balance mass; with an attached balance motor and a mass, but without electrical coupling; with a shorted balance motor and a mass; with a coupled balance motor and a mass; and with a second generator (or energy converter, as in FIG. 2), but which is not operating.

Similar tests were then repeated using the variable transformer 76 within the analog control circuitry 174 (of FIG. 5), instead of using the voltage divider 84 (of FIG. 7), to control operation of the linear motor. Voltage and current at the linear motor were recorded to allow for calculation of parasitic power during various modes of testing. Output from the load cell was also measured in order to determine the vibration force that the Stirling generator transferred to the rigid mounting frame. The output voltage signal from the alternator of the Stirling generator was recorded as a reference for frequency and phase measurements.

As shown in FIGS. 5 and 7, tuning capacitor 78 is configured to balance inductance of the linear balance motor 40. By adjusting the variable resistor 86 (of FIG. 7), the voltage level of the output to the linear balance motor is changed. Furthermore, changing the leads (to realize a desired impedance) at linear motor 40 changes the phase of the output. Optionally, variable transformer 76 (of FIG. 5) is adjusted to appropriately adjust the voltage level of the output to the linear balance motor.

Irrespective of the implementation used in FIGS. 5 and 7, the linear balance motor is tuned in order to minimize power draw from the linear alternator by resonating the linear balance motor at the operating frequency. As a result, tuning is realized at an energy level that is close to that realized by a passive balance system.

During testing of the analog control circuitry 274 of FIG. 7, the linear balance motor was activated using feedback through the voltage divider 84. When the electrical connections are broken, the balance mass continues to oscillate, thereby passively dampening vibrations from moving components of alternator 19 of the generator. The resulting damping worked well over a wide range of power output levels from the generator (or converter) and drew no parasitic power.

Damping via the active balance system did not start out passively. If the generator were started with the linear balance motor uncoupled electrically, the motion of the balance mass was found to actually add vibration forces to the overall generator system. However, once the linear balance motor and generator are electrically coupled, the balance mass moved out of phase with the generator and reduced the vibration forces. Once this operating mode was reached, the analog control circuitry could be disconnected without increasing vibration of the system.

The above-described damping technique provides fundamental energy cancellation. This technique can be used to cancel fundamental vibration forces of a single generator (or converter) in conjunction with the previously described active control techniques.

According to one mode of operation, an analog control circuit can be used to control the linear balance motor only when it is necessary to move it out of phase with the generator (or converter). In most cases, the active balance system will act passively, thereby not drawing any power. Whenever necessary, the analog control circuitry will act to move the active balance system into a passive mode. As a result, it is easier to control residual vibrations actively.

Microprocessor-Based Control Implementation

FIGS. 8–11 describe in greater detail microcontroller generation of vibration reduction waveforms for the controllers of FIGS. 1 and 2. FIG. 8 depicts the relation of microcontroller 88 (of controller 62) with respect to receipt of accelerometer data and piston displacement data from sensor of the system of FIG. 1. An analog output signal is generated by controller 62 and delivered to amplifier 90. A DC power output from a rail of controller 62 (or an AC/DC converter) is also input to amplifier 90. An output from amplifier 90 is input to balance motor 40.

More particularly, accelerometer 96 detects vibration and sends an output signal to microcontroller 88 of control system 62. Additionally, control system 62 receives an input signal comprising a piston and/or displacer displacement value. Microcontroller 88 then generates an analog output signal which is delivered to amplifier 90. A separate engine controller 92 provides an additional input signal to amplifier 90 corresponding with a DC power value from the DC power supply 93 retrieved from a controller rail or an AC-DC converter. Amplifier 90 then generates an output signal to balance motor 40 to controllably regulate operation of balance motor 40 so as to substantially cancel out vibrations caused by the piston displacement 94.

FIG. 9 is a more detailed schematic block diagram of the diagram of FIG. 8 illustrating further details of the microcontroller generation of vibration reduction waveforms for the controller of FIG. 1.

More particularly, microcontroller 88 receives an input signal representing piston/displacer displacement 94, or a signal from an analogous transducer capable of measuring such displacement. Furthermore, microcontroller 88 receives an input signal from an accelerometer or analogous vibration transducer 96. One version of such transducer 96 comprises accelerometer 48 (of FIG. 1).

Microcontroller 88 comprises an analog-to-digital (A/D) converter displacement signal 98 which is converted using an analog to digital converter. Likewise, an A/D converter vibration signal 100 is converted using the signal from transducer 96 to generate an A/D converter vibration signal 100. An amplitude/phase shift algorithm 102 calculates amplitude and phase for the vibration signal. A digital-to-analog (D/A) converter generates a D/A converter output signal/waveform 104. Microcontroller 88 further includes memory 66 in which a displacement memory stack 166 is provided. An output from stack 166, i+ phase, and an amplitude are combined by a multiplier 106 to produce an output comprising output signal/waveform 104. Signal/waveform 104 is input to amplifier 90 which further receives a DC power input from engine controller 92. Amplifier 90 generates a waveform which is input to balance motor 40.

Amplitude/phase shift algorithm 102 comprises a modified form of Newton's method to search for phase and amplitude, as described below with reference to FIG. 11. Such method is implemented via a microprocessor or microcontroller 88. In contrast, the previously described LabVIEW FFT implementation used a binomial search method that is computationally intensive, and takes more time.

Memory 66 comprises a table of sufficient size to store at least one period of displacement data for an operating engine. In one case, memory 88 comprises random access memory (RAM).

FIG. 10 is a simplified schematic view illustrating the reading and storing of engine output voltage within a table in memory, and further illustrating microcontroller lookup of a value stored at a location phase shifted behind the current table location, and multiplied by an amplitude to determine a microcontroller output value.

As shown in FIG. 10, an input signal is read and stored at location i in memory, wherein the memory comprises a table of stored data. An output signal is read at i+ Phase. A multiplier receives the output signal along with an amplitude, generating a scaled output. This solution produces a smooth output wave. The solution also eliminates the need for two data acquisition (DAQ) cards, as would be required by some prior art implementations. Furthermore, the solution does not require triggering or frequency analysis.

When implementing control via the control system of FIGS. 8–10, a vibration reduction waveform is generated via the microcontroller suitable for substantially canceling out engine vibrations using the balance motor assembly 25 (of FIG. 1).

FIG. 11 is a simplified plot illustrating a modified Newton's method implemented in the controller of FIGS. 1, 8 and 9 and used to search for phase and amplitude. More particularly, the modified form of Newton's method is used to search for phase and amplitude. Here, f(x) represents vibration level. According to Newton's method:

$$\chi_{i+1} = \chi_i + \frac{f(\alpha) - f(\chi_i)}{f'(\chi_i)}$$

$$f(\alpha) = 0$$

$$\chi_{i+1} = \chi_i - \frac{f(\chi_i)}{f'(\chi_i)}$$

$X_{I+1}$ is the point on the line tangent to f(x) which intersects the x-axis. Here x is the value being searched for: either the phase or the amplitude.

The algorithm alternatively searches for amplitude and phase. Since the derivative of the function f(x) is unknown and it is desirable to reduce the processing time, Newton's method is modified as follows:

$$X_{i+1} = X_i + y^*z$$

y is determined from the following table.
v is the measured level of vibration.
z is some fraction of the amplitude of the vibration signal.

|  | $X_i - X_{i-1} > 0$ | $X_i - X_{i-1} < 0$ |
| --- | --- | --- |
| $V_i - V_{i-1} > 0$ | −1 | +1 |
| $V_i - V_{i-1} < 0$ | +1 | −1 |

Comparison of Implementation Alternatives

Accordingly, FIGS. 1, 2 and 8–11 depict a microcontrolled active vibration balancer embodiment, with FIG. 3 illustrating a further option implementation for eliminating vibration modes above a primary mode. FIG. 4 illustrates a relatively simple and economical vibration balance implementation when placing two machines back to back and AC coupling together the machines along with using tuning capacitors so as to minimize vibration. FIGS. 5 and 7 illustrate two very similar vibration reduction systems comprising active vibration balance systems.

With respect to the analog circuit implementations of FIGS. 5 and 7, a balance load is connected to an alternator using a variable transformer or variable resistor, respectively. In one case, the variable transformer is a Variac™. Use of such analog circuit implementation enables reduction of vibration level below a level that could be obtained using a passive system.

More particularly, the relatively simple coupling of an alternator and a linear balance motor via analog circuitry drives the balance motor 180 degrees out of phase with the alternator (or generator). By tuning voltage to the balance motor, the balance motor can be driven at an amplitude that results in lower vibration levels than could otherwise be achieved using a passive system. Once the balance motor has been started (begins to operate) using a signal from the alternator via the variable transformer/resistor (of FIGS. 5 and 7, respectively), the signal from the alternator can be removed. As a result, the balance motor and mass will continue to oscillate, thereby resulting in a low vibration which is lower than that achievable using a passive system.

When using the microcontroller systems of FIGS. 1–2 and 8–11, adjustment can be made to the phase angle and amplitude of the drive motor. Adjustment of the phase angle allows the microcontroller version of an active vibration system to reach relatively lower levels of vibration than are obtainable using a transformer/resistor coupled implementation, as shown in FIGS. 5 and 7. The phase angle adjustments comprise relatively small adjustments around the 180 degree phase shift. For example, such adjustments are conducted around in the range of 170–180 degrees phase shift.

It appears that there is some phase lag (or lead) in the total system which can be corrected using this small adjustment of phase angle. This procedure reduces vibration that is produced by the fundamental frequency.

More particularly, amplitude and phase for the drive motor can be adjusted to reduce vibration as discussed below. Basically, the waveform, such as voltage from the alternator or from an alternator mover/piston position sensor, is digitally stored in an array (see FIG. 10). Optionally, signals from an accelerometer or other transducer can be used. A phase adjustment, or shift, is added to the waveform. The new waveform, including the phase shift, is then multiplied by a factor (such as amplitude) in order to obtain a microprocessor output. The resulting signal is then amplified and sent to the balance motor. If the resulting vibration decreases, this process is repeated. However, if the vibration increases, the phase adjustment is subtracted from the waveform, and the process is repeated. Accordingly, phase adjustment is carried out in this manner over several cycles.

The above process is then repeated in order to implement amplitude adjustment. More particularly, phase remains fixed, and amplitude to the balance motor is increased using the microprocessor. If the vibration is reduced, the amplitude process is repeated with a decrease in amplitude. If the vibration increases with increasing amplitude, the amplitude should decrease, and it is therefore checked for a decrease in vibration. Then, the process is repeated for several cycles of amplitude adjustment.

Accordingly, phase and amplitude adjustment as discussed above are carried out continuously until vibration is minimized. Furthermore, the sampling process will continue to keep vibration at a minimum level. The above discussion refers to vibration that is emanating from an alternator, because voltage signals from the alternator are used to establish a waveform that is stored in an array upon which all phase and amplitude adjustments are based.

For the case of vibrations that emanate other than from a mover/piston, a fast Fourier transform (FFT) can be implemented on a signal from the accelerometer (or load cell) in order to obtain frequency and amplitude. Using the process described above, adjustments can be carried out with voltage to a balance motor (which is a different motor than the one used to eliminate the mover/piston vibration). These adjustments are made to minimize vibration at frequencies other than the mover/piston frequencies. However, several balance motors may be required in order to obtain extremely low vibration.

It is understood that the implementation of FIG. 1 utilizes the linear motor and counterbalance mass to minimize or eliminate a fundamental vibration frequency (or mode). A higher power input is needed for the linear balance motor in order to cancel out higher harmonics. Alternatively, the additional solenoid-based linear balancer of FIG. 2 can be utilized to reduce or eliminate higher harmonics (modes) of vibration. Accordingly, the solenoid-based linear actuator of FIG. 2 provides a second balance motor that is tuned for a second harmonic frequency, enabling cancellation of the second harmonic frequency utilizing a relatively low input power to the linear actuator. A similar implementation could be utilized to eliminate third and higher order harmonics (or modes) of vibration frequency.

As shown in FIG. 1, the balance motor stator and mover configurations can optionally be reversed such that the mover is fixed and the stator is moving. Such optional configuration would further enhance the moving mass since the stator tends to be of heavier mass than the mover, thereby reducing the size needed for the counterbalance mass, or even eliminating the need for a counterbalance mass.

As discussed above, LabVIEW was utilized as a tool for purposes of evaluating the frequency spectrum of an engine or generator, as evaluation of a basic microprocessor control system. The LabVIEW implementation as discussed above comprises a related art development which led to design of the further described embodiment control systems.

With reference to the microprocessor-based active vibration control system of FIGS. 1–2 and 8–11, vibration cancellation can be implemented on a Stirling cycle system, such as a Stirling cycle engine. As shown with respect to FIG. 1, the vibration control system includes a microcontroller, a vibration transducer (such as a load cell or an accelerometer), an amplifier, and a motion actuator. The motion actuator moves a counterbalance mass in a manner that is controllably regulated via the microcontroller in response to vibrations that are detected with the vibration transducer.

At a minimum, the microcontroller provides a method to input an analog signal from the vibration transducer and an analog signal that approximates the movement of a component inside the engine, such as an alternator output voltage which indicates a mover of the alternator. The microcontroller also provides a method to output an analog signal to the motion actuator. The microcontroller receives the analog input signals, then generates a corresponding output signal. The amplifier increases output of the microcontroller, thereby driving the motion actuator and counterbalance mass in order to reduce or substantially cancel out vibration of the engine.

There exist many applications, such as on Stirling engines and on Stirling coolers, where unwanted vibration needs to be cancelled. An active vibration control system, according to the implementation of FIGS. 1–2 and 8–11, comprises a controller and an actuator for moving a counterbalance mass. When vibration forces produced by the actuator are 180 degrees out of phase with vibration forces emanating from the Stirling machine, vibration is either minimized or eliminated.

More particularly, the majority of vibration, indicated by energy, which needs to be cancelled in a Stirling system is found at the operating frequency of the system, wherein smaller vibration contributions occur at higher harmonics. When utilizing the implementation of FIG. 1, it is practical to cancel the base frequency using the actuator and counterbalance mass, and ignore the higher frequencies which contribute significantly smaller amounts of vibration. The implementation depicted in FIG. 2 enables the cancellation of vibration frequencies at numerous higher harmonic frequencies. Furthermore, the implementation of FIG. 3 enables the cancellation of vibration that does not occur at higher harmonic frequencies, but occurs at non-integer multiples of the base frequency.

In order to cancel vibration at a frequency, the controller calculates an optimal output, then produces a signal corresponding with that output. Three main variables can be used to describe an output waveform for each frequency that is desired of being cancelled. The three variables comprise frequency, amplitude, and phase. The output frequency should match very closely to that of the frequency of the vibration, or a beat frequency will appear and the vibration cancellation will not work. The amplitude of the signal should be such that, after amplification, the actuator will produce a force equal to the vibration level. The phase of the signal should be such that the movement of the actuator is shifted 180 degrees relative to the vibration.

Accordingly, the microcontroller-based control system achieves a desirable result using a single circuit board, thereby reducing cost, size and complexity of a control system. All the steps which are necessary to generate a desired output waveform are programmed into the microcontroller. Optionally, multiple microcontrollers can be utilized. A microcontroller reads and stores engine output voltage in a table, in memory as depicted with reference to FIG. 10. The engine output value correlates with movement of the piston in the Stirling machine, or engine. Movement of the piston and machine relates well to vibration of the Stirling machine and system.

After each time the microcontroller reads a value, the microcontroller looks up the value stored at the location which is "phase" units behind the current table location, as described with reference to FIG. 10. This value is then multiplied by "amplitude" in order to determine the microcontroller output. The output is then amplified and fed into the motion actuator. Because the control system reads and writes at the same time, the frequency inherently matches that of the engine, and the need to calculate frequency is eliminated. Such implementation removes the need to perform a computationally intensive FFT calculation, thereby ensuring that the output frequency will always substantially match the vibration frequency. In such case, there is no need to trigger the signal since the output is always locked onto the input by use of the table in memory.

Accordingly, the above method is not computationally intensive. The microcontroller also contains an algorithm to determine the best amplitude and phase delay, as depicted in FIG. 11. Such algorithm can be easily upgraded or modified, thereby enhancing the flexibility of the control system design.

It is understood that other variations and embodiments can be implemented to conduct vibration reduction. For example, one variation comprises a balance motor that is divided into two or more smaller balance motor assemblies. The two or more smaller balance motor assemblies are disposed such that the combined center of mass of their moving portions is coaxial with the unbalanced mover. Each of such smaller balance motor assemblies is dedicated to a specific harmonic frequency. Accordingly, distinct, dedicated harmonic frequencies can be eliminated by each of the smaller balance motor assemblies, thereby enhancing overall vibration reduction.

According to another implementation, a vibration control system includes more than a single pair of first and second axially reciprocating machines. Additional pairs of balanced reciprocating machines are disposed such that the net unbalanced force of half the machines is opposed to the net unbalanced force of the other half of the coaxial machines. For example, one implementation utilizes two pairs of such machines in either a planar disposition or a square, three-dimensional disposition. In both cases, such pairs of machines are mechanically and electrically coupled together so as to minimize (or eliminate) vibration for the entire system.

FIG. 12 illustrates a further alternatively constructed counterbalanced Stirling cycle generator system 212 including a balance system 210 mounted onto a Stirling cycle power generator, or engine, 14.

According to one construction, balance system 210 is provided solely by a variable resistor 170 that is connected to an alternator. More particularly, an alternator is provided by a balance motor in the form of linear motor 40. Accordingly, balance motor 40 is configured as an alternator which is coupled to variable resistor 170. Output from the alternator goes to a tunable, variable load that is provided by variable resistor 170 in order to dissipate power. According to the one construction, a variable resistor is utilized. However, according to another construction, a discrete resistor is used. Load provided by variable resistor 170 imparts a load that imparts damping to the entire system. Accordingly, system vibration reduction can be realized by tuning variable resistor 170. In the case where a discrete resistor is used, a properly sized resistor is inserted into a circuit in order to tune the load.

Variable resistor 170 is selected to provide a high resistance value relative to the effective resistance of the useful load that extracts primary power from the linear alternator. In this manner, the power drained by the balancer control function through variable resistor 170 is a small percentage of the total power produced by the linear alternator, thus retaining a high efficiency for the system using such a balancer approach.

According to one construction, variable resistor 170 is hand-tuned by a user. According to an optional construction, variable resistor 170 is automatically tuned using a linear actuator 172 that is driven by way of a feedback control system via active vibration control system 242.

When variable resistor 170 is hand-tuned, a resulting reduction in vibration is greater over that which is provided by using a purely passive system that does not have an alternator, but which only uses spring and mass components. However, it is less than what is provided when using a well-tuned active vibration system having a feedback control system, as depicted in FIG. 1.

According to the optional implementation, active vibration control system 242 is optionally provided on balance system 210, making such system an active balance system. Accordingly, accelerometer 48 is also optionally provided in such construction, thereby providing an input to control system 242. Control system 242 also provides an output to heater head 20 in order to regulate the delivery of heat to generator 14. Control system 242 also provides an output to linear actuator 172 in order to adjust the resistance value of variable resistor 170 to a desired level. Resistor 170 imparts a desired load for power dissipation on the alternator (linear balance motor 40).

According to one construction, linear actuator 172 comprises a screw-driven linear actuator having a rotary encoder.

According to another construction, linear actuator 172 comprises a linear gear rack driven by a rotary gear and electric motor. However, it is understood that any of a number of actuators can be utilized to adjust the resistance value for variable resistor 170 in response to a signal from control system 242. Furthermore, it is understood that the general construction of generator 14 follows that depicted in the embodiment of FIG. 1. Furthermore, the construction of active vibration control system 242 is similar to the control system 42 (of FIG. 1).

FIG. 13 illustrates another alternatively constructed active balance system 310 in which four distinct Stirling power generators 114 are provided with an active vibration control system 342. Each of Stirling power generators 114 are configured in parallel relation. However, adjacent generators are run in opposite 180 degree phase, and diagonally opposite generators are run in identical, synchronized phase. Accordingly, active vibration control system 342 is used to manage the synchronized operation of such four generators. Furthermore, active vibration control system 342 controllably delivers heat by way of heater head 120 to the heater heads of each generator 114.

By utilizing the configuration depicted in FIG. 13, a single, common heater source, or heater, 120 can be utilized to run each of generators 114, since the four heater heads are provided adjacent, aligned and proximate relation. Additionally, the linear alternators are connected together. By running such generators in opposite phase, significant counterbalance can be realized, while reducing the overall length of balance system 310.

According to the four-engine balance scheme utilized in balance system 310, engine balancing is imparted while maintaining all the hot ends of generators 114 adjacent to one another. Diagonally opposite engines move together, 180 degrees out of phase with the remaining, opposite diagonally paired generators. All four generators are coupled together and rigidly affixed together using a frame 246 and mounting brackets. Furthermore, the respective alternators are connected in parallel, with a polarity that achieves the above-described diagonally opposite and 180 degrees out of phase operating characteristic. Accordingly, the four generators are ganged together such that the heater heads are located together so as to deliver heat from a common heat source, or heater, 120. Such a four-engine balance scheme can deliver a relatively significant amount of power therefrom.

Although four generators are shown in the embodiment depicted in FIG. 13, it is understood that any even number of similar free-piston engines/alternators can be rigidly connected together in axial or co-linear alignment, with half the engines configured with moving members (or pistons) moving in one direction and the other half of the engines moving in an opposite direction (180 degrees out of phase). Preferably, diagonally opposite units have pistons moving in the same direction and with their centers of mass at the midpoint when viewed from the end. Similarly, other pairs of diagonally opposite pistons have their center of mass at the same midpoint location, but they are moving in opposite directions to the first group. It is understood that there exist many other ways to configure engines to meet the above conditions. For example, the four engines depicted in FIG. 13 could be laid out in a single, common straight line (with the axes of all four engines in a single plane). Such engines could be equally spaced apart, with the inner two pistons moving in one direction and the outer two pistons moving in an opposite direction. Further additional alternative configurations can also be envisioned and are intended to be encompassed by the present invention.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. An active vibration control system for an axially reciprocating machine, comprising:

a housing;

a linear alternator having a stator rigidly carried by the housing and a mover supported for axially reciprocating movement;

a counterbalance mass provided for axially reciprocating movement along an axis substantially coaxial with a motion axis of the mover of the linear alternator;

a linear actuator communicating with the mass, carried by the housing, and configured to move the counterbalance mass relative to the alternator at a substantially common frequency; and analog control circuitry including voltage divider circuitry, the analog control circuitry communicating with the linear actuator and user adjustable to adjust displacement amplitude of the linear actuator relative to the mover of the linear alternator.

2. The control system of claim 1 wherein the voltage divider circuitry comprises a variable resistor and a tuning capacitor.

3. The control system of claim 1 the linear alternator and the linear actuator operate at different operating voltages, and the voltage divider circuitry couples together the linear alternator and the linear actuator so as to accommodate the respective different operating voltages.

4. An active vibration control system for an axially reciprocating machine, comprising:

a housing;

a linear alternator having a stator rigidly carried by the housing and a mover supported for axially reciprocating movement;

a counterbalance mass provided for axially reciprocating movement along an axis substantially coaxial with a motion axis of the mover of the linear alternator;

a linear actuator communicating with the mass, carried by the housing, and configured to move the counterbalance mass relative to the alternator at a substantially common frequency; and analog control circuitry including decoupling circuitry, the analog control circuitry communicating with the linear actuator and user adjustable to adjust displacement amplitude of the linear actuator relative to the mover of the linear alternator.

5. The control system of claim 4 wherein the decoupling circuitry comprises a variable transformer and a tuning capacitor, wherein the variable transformer electromagnetically couples together the linear alternator and the linear actuator.

6. A vibration control system for linear reciprocating machines, comprising:

a first axially reciprocating machine;

a second axially reciprocating machine rigidly mounted in aligned relation with the first axially reciprocating machine, electrically coupled with the first axially reciprocating machine, and operated in synchronized, opposed directions relative to the first axially reciprocating machine;

first tuning circuitry associated with the first axially reciprocating machine; and second tuning circuitry associated with the second axially reciprocating machine;

wherein one of power to at least one of the machines and a tuning factor for at least one of the first tuning circuitry and the second tuning circuitry is adjusted to minimize vibration for the linear reciprocating machines.

7. The control system of claim 4 wherein the first tuning circuitry comprises a first tuning capacitor and the second tuning circuitry comprises a second tuning capacitor, and wherein the tuning factor comprises a capacitance value for at least one of the first tuning capacitor and the second tuning capacitor.

8. The control system of claim 7 further comprising a vibration force detector and a vibration controller, wherein the vibration controller receives a signal indicative of detected vibration forces of the system, and, in response to the signal, the controller regulates at least one of operation of at least one of the machines and a capacitance value of at least one of the tuning capacitors so as to substantially reduce the detected vibration forces.

9. The control system of claim 8 wherein the controller adjusts power generated by one of the reciprocating machines.

10. The control system of claim 8 wherein the controller adjusts capacitance value for one of the first capacitor and the second capacitor.

11. The control system of claim 8 wherein power to the reciprocating machines and capacitance values for the tuning capacitors are adjusted so as to substantially reduce detected vibration forces for a primary mode vibration frequency, and further comprising a linear alternator and a counterbalance mass, the linear alternator having a stator rigidly carried by at least one of the machines and a mover supported for axial reciprocating movement, the counterbalance mass carried by the mover for axially reciprocating movement along an axis parallel with a motion axis of the mover.

12. The control system of claim 11 wherein the counterbalance mass comprises at least one balance mass disposed such that a net effective balance mass is coaxial with an axis of reciprocation of the generator.

13. The control system of claim 11 wherein the control system controllably regulates operation of the linear alternator to move the counterbalance mass so as to reduce vibration at a secondary mode of the vibration frequency.

14. The control system of claim 7 wherein the first tuning circuitry and the second tuning circuitry comprises a digital signal processor configured to implement power factor correction circuitry that implements digital tuning by changing current phase angle and relationship relative to voltage so as to realize a power factor of unity.

15. A method for controlling vibration from axially reciprocating machines, comprising:

providing a first axially reciprocating machine with an associated first tuning circuitry and a second axially reciprocating machine with a second tuning circuitry, wherein the first machine and the second machine are rigidly mounted together in axially aligned relation;

AC coupling the first axially reciprocating machine with the second axially reciprocating machine;

operating the first machine and the second machine in synchronized, opposed directions; and adjusting power to at least one of the machines or adjusting a tuning value for at least one of the first tuning circuitry and the second tuning circuitry to minimize vibration for the axially reciprocating machines.

16. The method of claim 15 wherein the first tuning circuitry comprises a first tuning capacitor and the second tuning circuitry comprises a second tuning capacitor, wherein the tuning value for each of the first tuning capacitor and the second tuning capacitor each comprises a capacitance value.

17. The method of claim 16 further comprising controllably regulating a capacitance value for at least one of the tuning capacitors to decrease vibration forces.

18. The method of claim 16 further controllably regulating power delivery to at least one of the machines to minimize vibration forces.

19. An active vibration control system for an axially reciprocating machine, comprising:

a housing;

a linear alternator having a stator rigidly carried by the housing and a mover supported for axially reciprocating movement;

a counterbalance mass provided for axially reciprocating movement along an axis substantially coaxial with a motion axis of the mover of the linear alternator;

a linear actuator communicating with the mass, carried by the housing, and configured to move the counterbalance mass relative to the alternator at a substantially common frequency;

analog control circuitry communicating with the linear actuator and user adjustable to adjust displacement amplitude of the linear actuator relative to the mover of the linear alternator; and a Fast Fourier transform (FFT) analyzer and a vibration force detector, the FFT analyzer configured to detect vibration frequencies of the axially reciprocating machine, wherein the analog control circuitry cooperates with the FFT analyzer to adjustably control the linear actuator and reduce the detected vibration frequencies, and the vibration force detector is coupled with the housing and operative to measure a vibration force generated by the axially reciprocating machine.

20. A vibration control system for linear reciprocating machines, comprising:

a first axially reciprocating machine;

a second axially reciprocating machine affixed in substantially force-opposed relation with the first axially reciprocating machine, and configured for operation in a synchronized, opposed direction relative to the first axially reciprocating machine;

a first tuning circuitry associated with the first axially reciprocating machine; and a second tuning circuitry associated with the second axially reciprocating machine;

wherein power to at least one of the machines is adjusted to minimize combined vibration for the reciprocating machines.

21. The control system of claim 20 wherein the first axially reciprocating machine is electrically coupled with the second axially reciprocating machine, and wherein a tuning factor for at least one of the first tuning circuitry and the second tuning circuitry is adjusted to minimize combined vibration for the reciprocating machines.

22. A vibration control system for linear reciprocation machines comprising:

a first axially reciprocating machine;

a first tuning circuitry associated with the first axially reciprocating machine and including a first tuning capacitor having a tuning factor comprising a capacitance value for the first tuning capacitor; and a second axially reciprocating machine affixed in substantially force-opposed relation with the first axially reciprocating machine, and configured for operation in a synchronized, opposed direction relative to the first axially reciprocating machine;

wherein power to at least one of the machines is adjusted by adjusting the capacitance value for the first tuning capacitor to minimize combined vibration for the reciprocating machines.

23. The control system of claim 22 further comprising a vibration detector and a vibration controller, the vibration detector configured to generate a signal indicative of detected vibration forces of the system, and, in response to the signal, the controller is configured to regulate operation of at least one of the machines to substantially reduce the detected vibration forces of the system.

* * * * *

UNITED STATES PATENT AND TRADEMARK OFFICE
CERTIFICATE OF CORRECTION

PATENT NO. : 6,809,486 B2
DATED : October 26, 2004
INVENTOR(S) : Songgang Qiu et al.

It is certified that error appears in the above-identified patent and that said Letters Patent is hereby corrected as shown below:

Column 17,
Line 60, delete "In one case, memory 88 comprises", and insert -- In one case, memory 66 comprises --.

Column 18,
Line 30, delete "$X_{I+1}$ is the point on the line", and insert -- $X_{i+1}$ is the point on the line --.

Column 24,
Line 34, delete "The control system of claim 1 the linear", and insert -- The control system of claim 1 wherein the linear --.

Column 25,
Line 14, delete "The control system of claim 4", and insert -- The control system of claim 6 --.

Column 26,
Line 16, delete "The method of claim 16 further controllably", and insert -- The method of claim 16 further comprising controllably --.

Column 27,
Lines 1-2, delete "A vibration control system for linear reciprocation machines comprising:", and insert -- A vibration control system for linear reciprocating machines, comprising: --.

Signed and Sealed this

Seventeenth Day of May, 2005

JON W. DUDAS
*Director of the United States Patent and Trademark Office*